United States Patent
Takeda et al.

(10) Patent No.: US 12,047,333 B2
(45) Date of Patent: Jul. 23, 2024

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 11 days.

(21) Appl. No.: 16/320,641

(22) PCT Filed: Jul. 24, 2017

(86) PCT No.: PCT/JP2017/026591
§ 371 (c)(1),
(2) Date: Jan. 25, 2019

(87) PCT Pub. No.: WO2018/021204
PCT Pub. Date: Feb. 1, 2018

(65) Prior Publication Data
US 2019/0173656 A1    Jun. 6, 2019

(30) Foreign Application Priority Data

Jul. 26, 2016 (JP) ................................. 2016-146465

(51) Int. Cl.
*H04L 5/02* (2006.01)
*H04J 1/00* (2006.01)
(Continued)

(52) U.S. Cl.
CPC ................ *H04L 5/023* (2013.01); *H04J 1/00* (2013.01); *H04L 5/0037* (2013.01);
(Continued)

(58) Field of Classification Search
CPC ..... H04L 5/023; H04L 5/0037; H04L 5/0094; H04L 27/26; H04J 1/00; H04W 28/06; H04W 72/04
See application file for complete search history.

(56) References Cited

U.S. PATENT DOCUMENTS

| | | | |
|---|---|---|---|
| 2010/0091702 A1* | 4/2010 | Luo | ..................... H04L 27/2613 375/267 |
| 2013/0242824 A1* | 9/2013 | Lee et al. | |
| (Continued) | | | |

FOREIGN PATENT DOCUMENTS

| | | |
|---|---|---|
| JP | 2015-512571 A | 4/2015 |
| JP | 2016-500940 A | 1/2016 |
| WO | 2016064534 A1 | 4/2016 |

OTHER PUBLICATIONS

Fujitsu, TDD frame structure with mixed numerology, 3GPP TSG-RAN WG1#85 R1-164331, May 23, 2016 (Year: 2016).*

(Continued)

*Primary Examiner* — Harry H Kim
*Assistant Examiner* — Mohammed M Murshid
(74) *Attorney, Agent, or Firm* — Osha Bergman Watanabe & Burton LLP

(57) ABSTRACT

The present invention is designed so that, even when communication is carried out by multiplexing a number of numerologies in the same carrier, it is still possible to communicate properly. A user terminal communicates in a radio communication system where frame structures of a plurality of numerologies are frequency-division-multiplexed, and has a receiving section that receives first information, which relates to a frame structure of a predetermined numerology, and second information, which specifies a period in which DL communication and/or UL communication are disallowed, or a period in which a specific communicating direction is configured, in the predetermined (Continued)

numerology, and a control section that controls DL receipt and/or UL transmission based on the first information and the second information.

5 Claims, 23 Drawing Sheets

(51) Int. Cl.
    *H04L 5/00*         (2006.01)
    *H04L 27/26*      (2006.01)
    *H04W 28/06*    (2009.01)
    *H04W 72/04*    (2023.01)

(52) U.S. Cl.
    CPC ............ *H04L 5/0094* (2013.01); *H04L 27/26* (2013.01); *H04W 28/06* (2013.01); *H04W 72/04* (2013.01)

(56) References Cited

U.S. PATENT DOCUMENTS

| | | | |
|---|---|---|---|
| 2014/0086112 A1* | 3/2014 | Stern-Berkowitz | H04L 5/14 370/280 |
| 2015/0131756 A1 | 5/2015 | Suh et al. | |
| 2016/0095039 A1* | 3/2016 | Valliappan | H04W 72/1215 370/332 |
| 2016/0119969 A1 | 4/2016 | Vajapeyam et al. | |
| 2016/0128092 A1* | 5/2016 | Azarian Yazdi | H04B 17/345 |
| 2016/0352551 A1* | 12/2016 | Zhang | H04L 5/0007 |
| 2017/0244535 A1* | 8/2017 | Islam | H04L 5/0058 |
| 2017/0332396 A1* | 11/2017 | Liao | H04L 27/26025 |
| 2018/0083743 A1* | 3/2018 | Chen | H04L 5/001 |
| 2018/0316464 A1* | 11/2018 | Stern-Berkowitz | H04L 1/1692 |
| 2019/0052354 A1* | 2/2019 | Roessel | H04B 7/2656 |
| 2019/0103931 A1* | 4/2019 | Yi | H04B 7/2656 |
| 2019/0288809 A1* | 9/2019 | Iyer | H04L 1/1893 |
| 2021/0126749 A1* | 4/2021 | Iyer | H04L 5/005 |

OTHER PUBLICATIONS

International Search Report issued in PCT/JP2017/026591 mailed on Oct. 3, 2017 (2 Pages).
Written Opinion of the International Searching Authority issued in PCT/JP2017/026591 mailed on Oct. 10, 2017 (4 Pages).
Fujitsu; "TDD frame structure with mixed numerology"; 3GPP TSG RAN WG1 Meeting #85, R1-164331; Nanjing, China, May 23-27, 2016 (5 Pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRA); overall description; Stage 2 (Release 12)"; Dec. 2014 (251 Pages).
3GPP TSG RA WG1 Meeting #84bis; R1-162931 "Frame Structure and Numerology for New RAT" Cohere Technologies, Telefonica, Telstra; Busan, South Korea; Apr. 11-15, 2016 (4 pages).
Office Action issued in European Application No. 17834210.1; Dated Aug. 6, 2021 (4 pages).
Office Action issued in Indian Application No. 17834210.1; Dated Aug. 17, 2021 (7 pages).
Office Action issued in the counterpart Europenan Application No. 17834210.1, mailed Apr. 18, 2023 (4 pages).
1 Office Action issued in Japanese Application No. 2018-529860; Dated Jun. 15, 2021 (8 pages) .
First Notice of Examination Opinion issued in Chinese Application No. 201780046756.1 mailed on Sep. 1, 2022 (22 pages).
Extended European Search Report issued in Application No. 17834210. 1, mailed on Feb. 12, 2020 (7 pages).

* cited by examiner

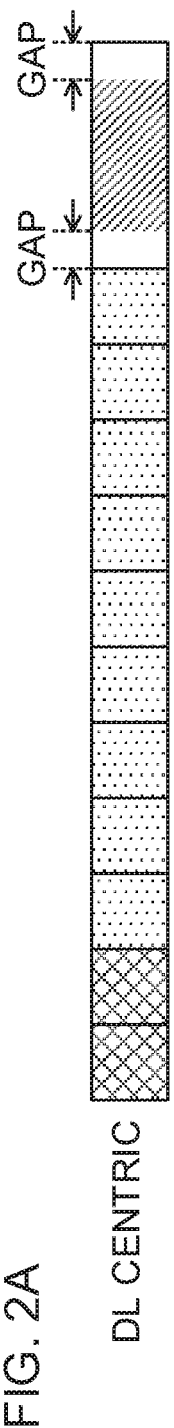
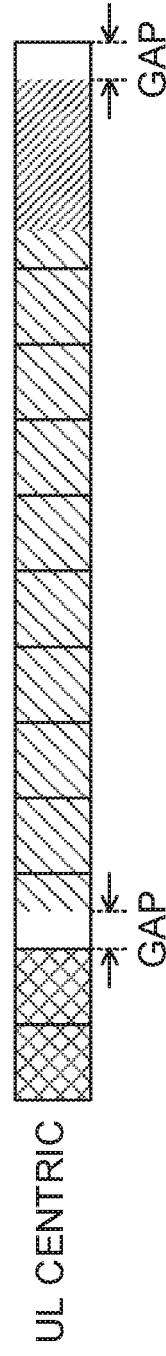
FIG. 2A
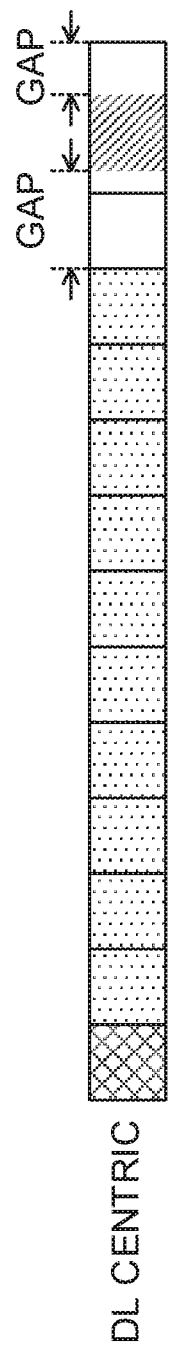
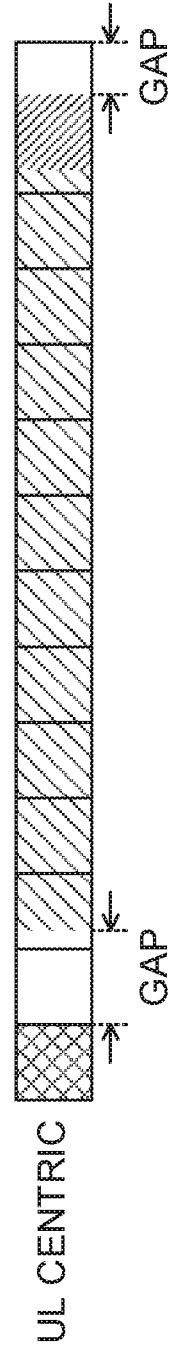
FIG. 2B

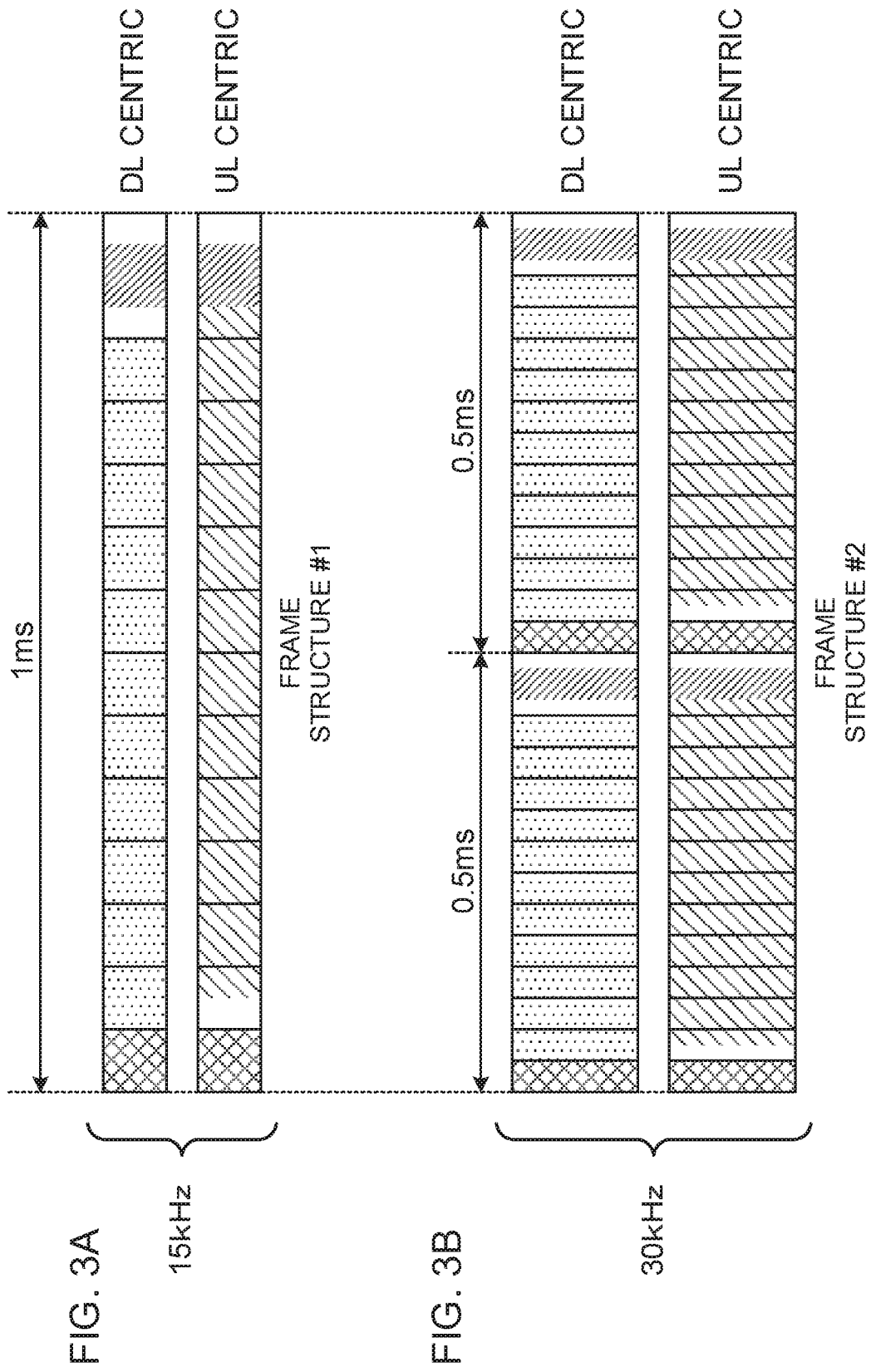

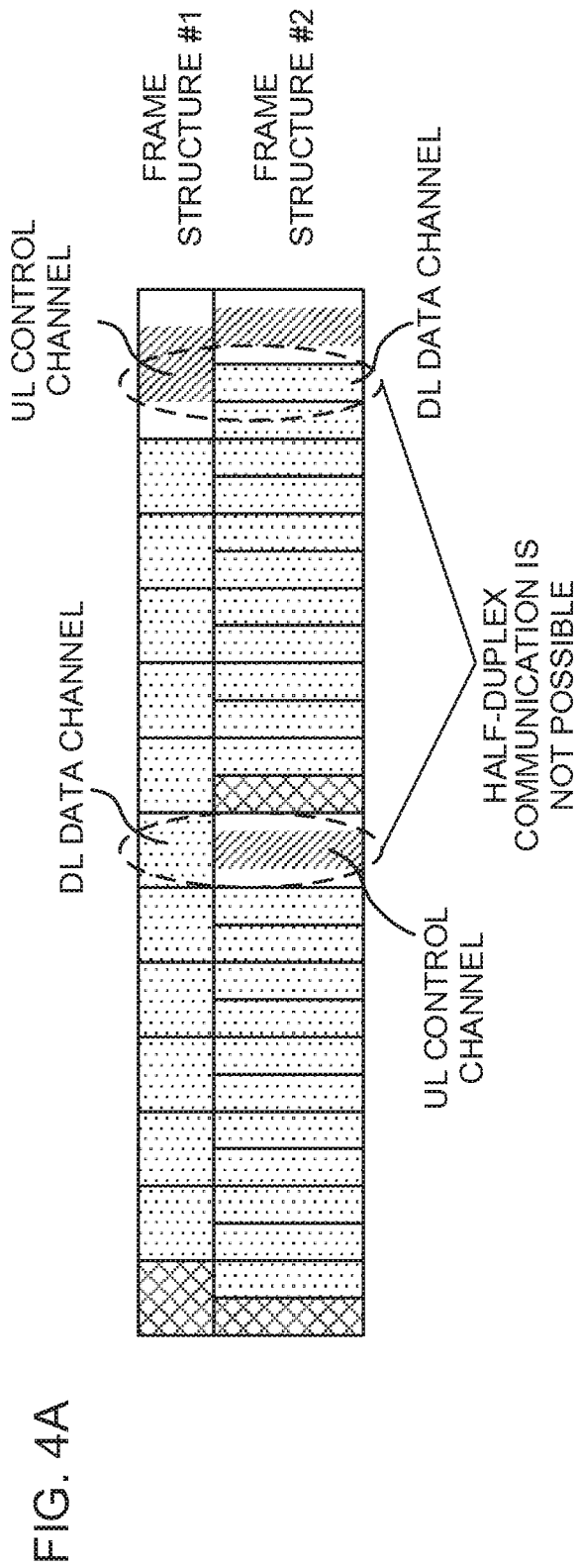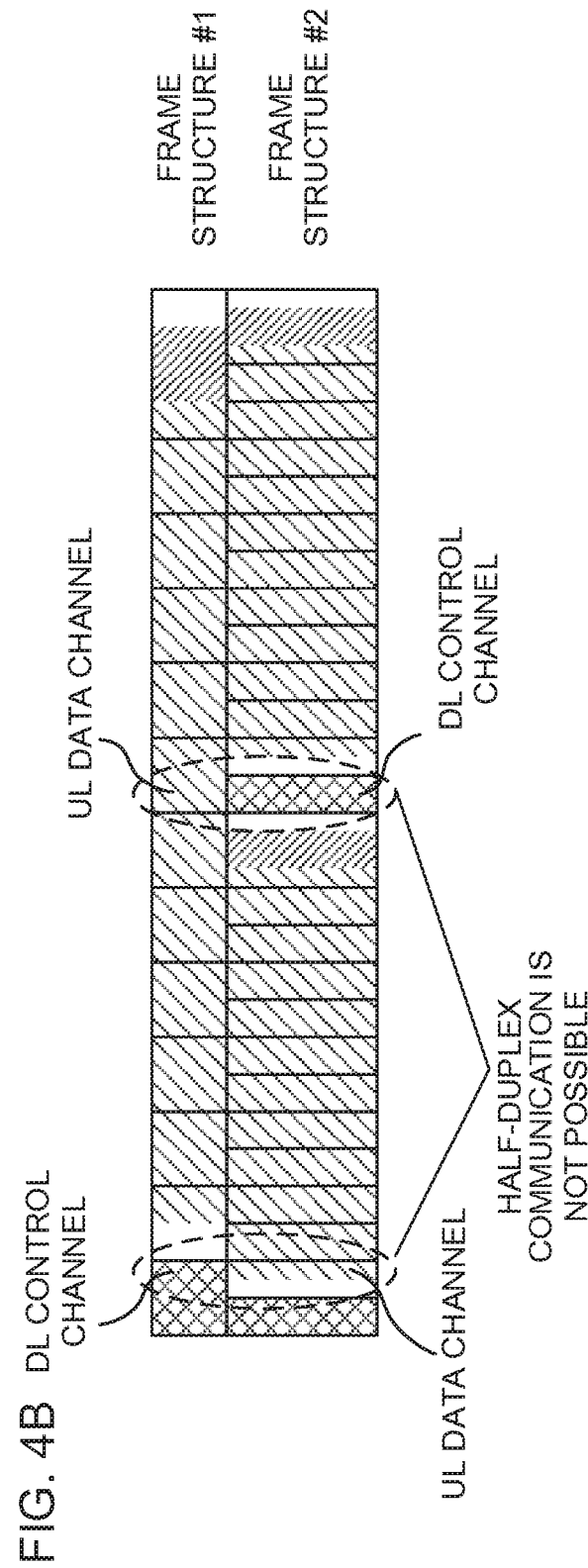

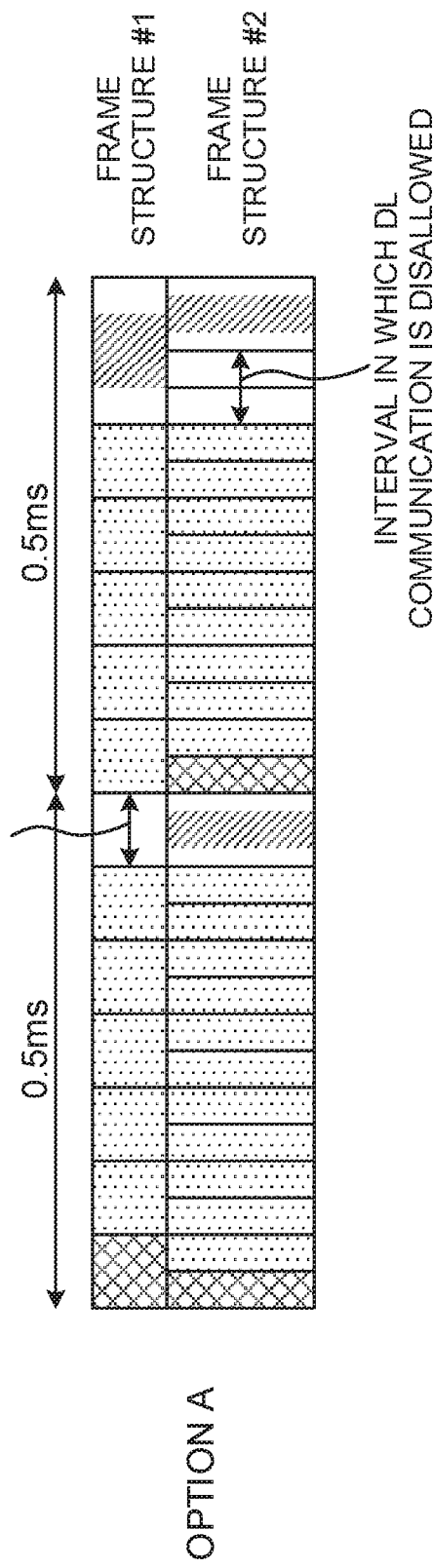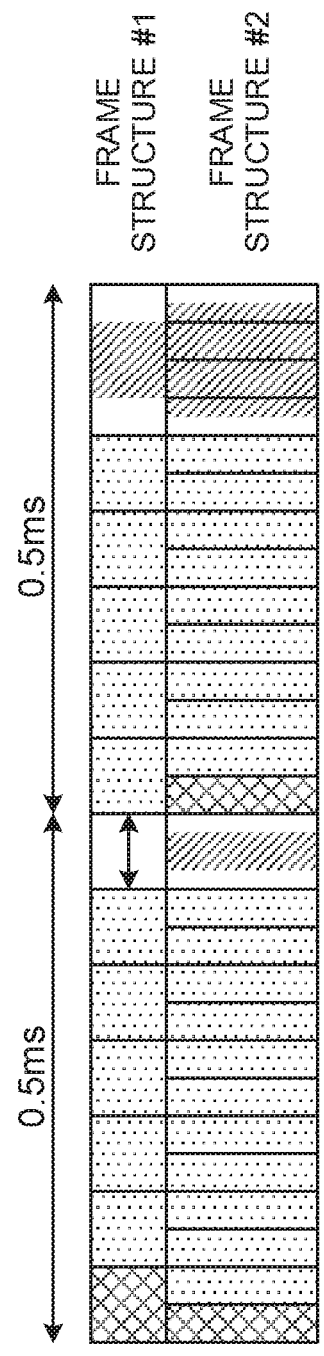
FIG. 8A
FIG. 8B

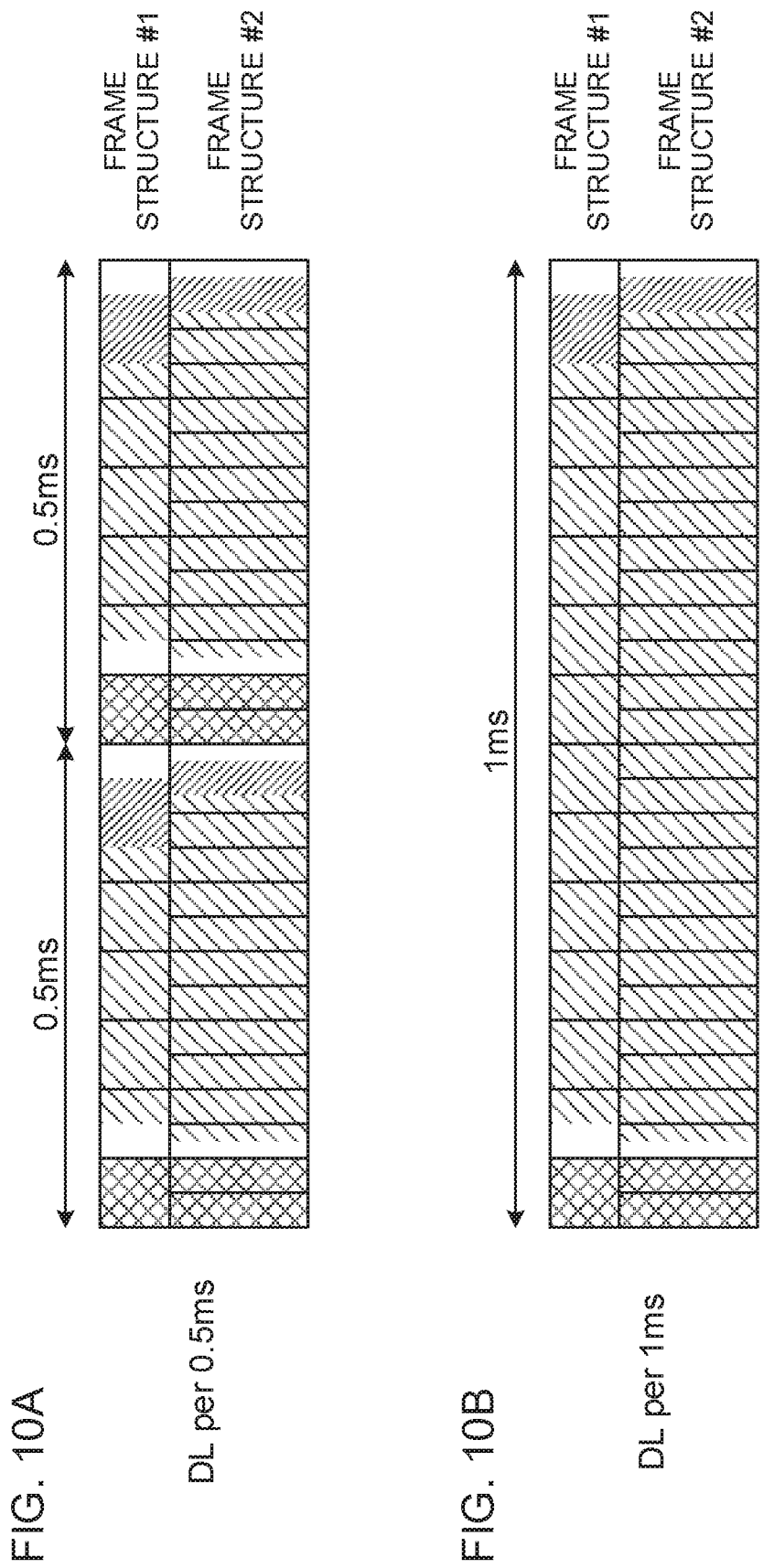

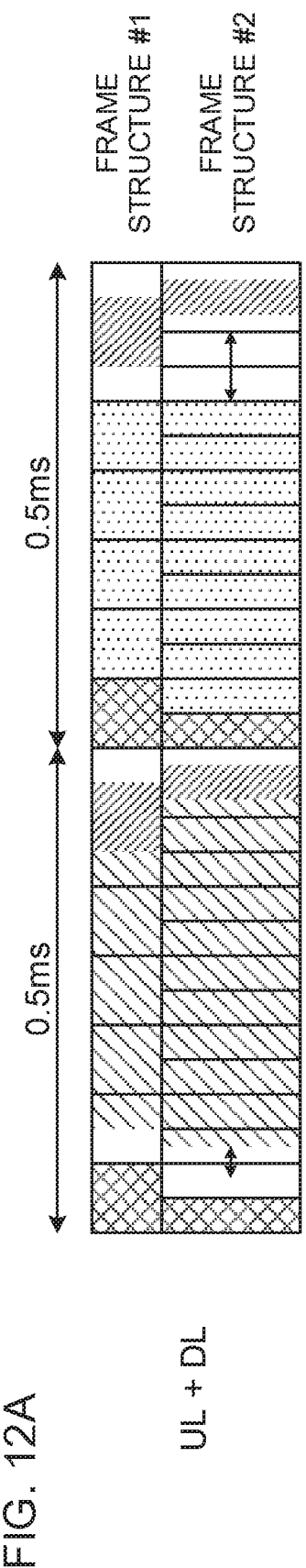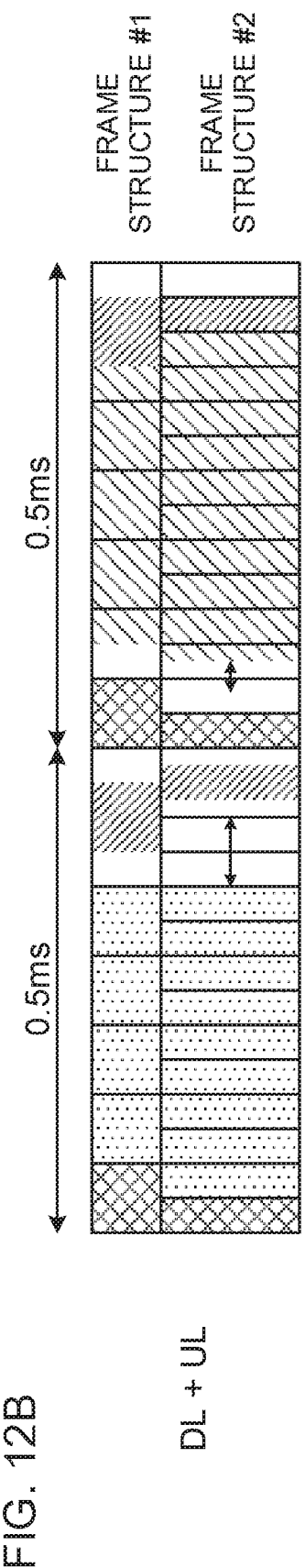

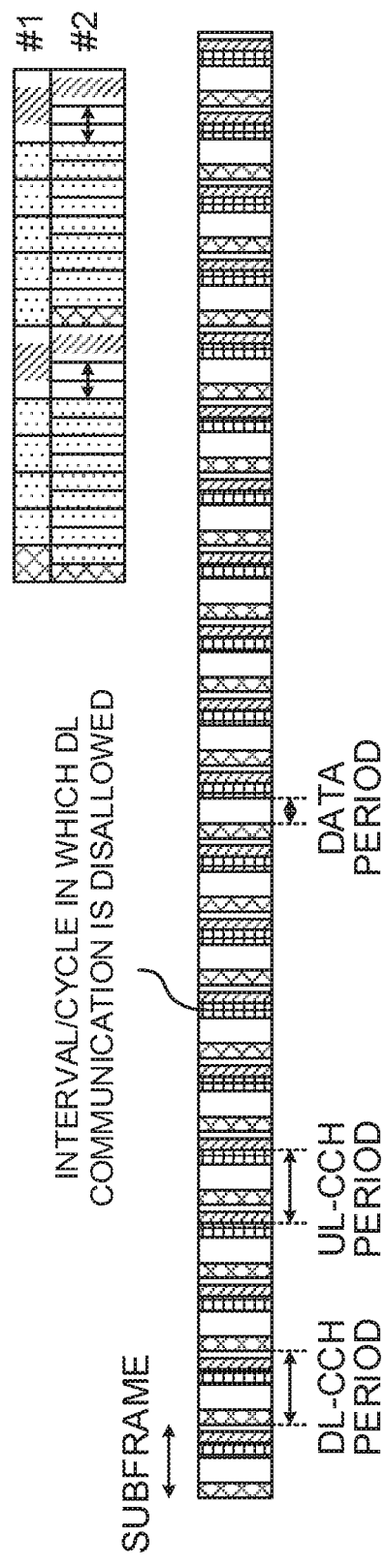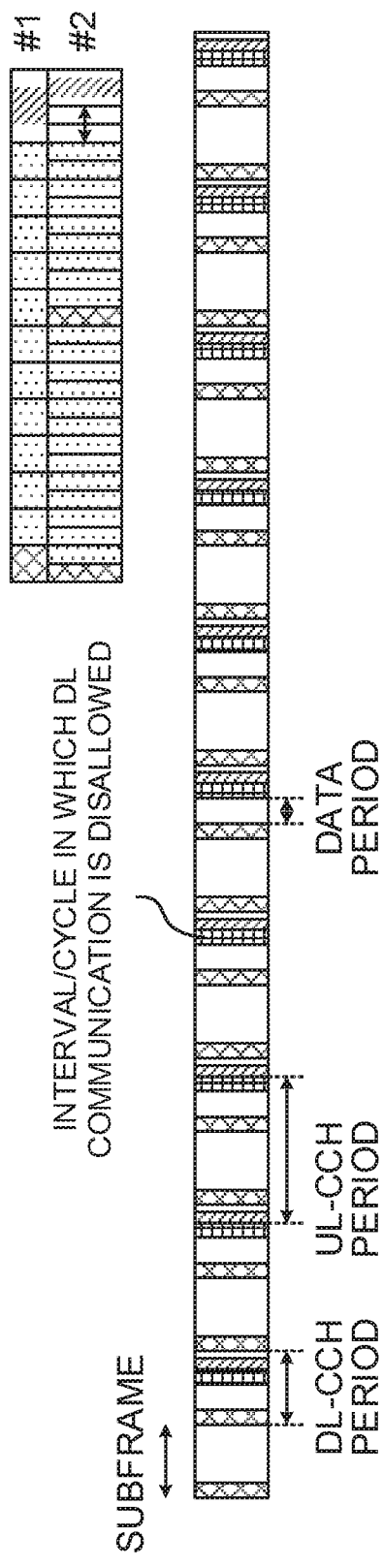

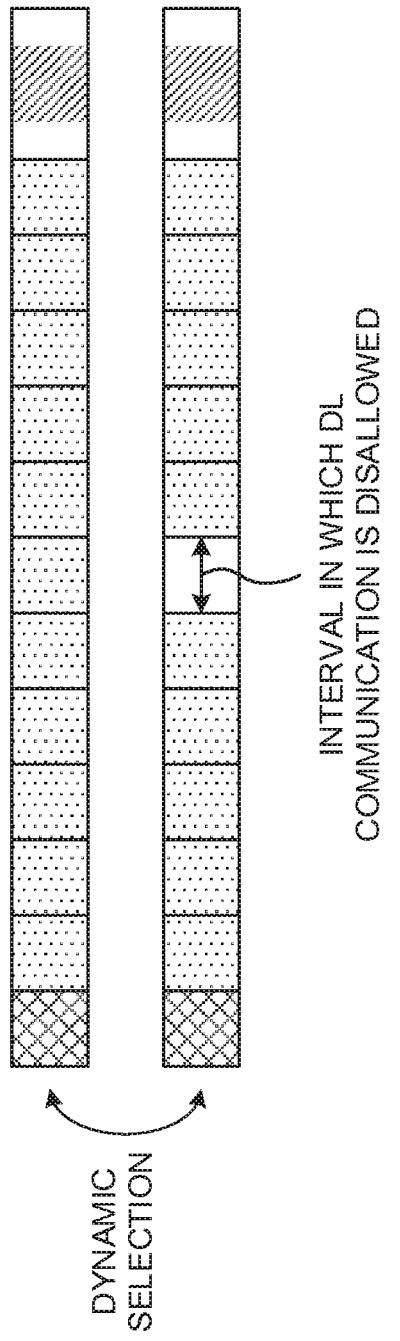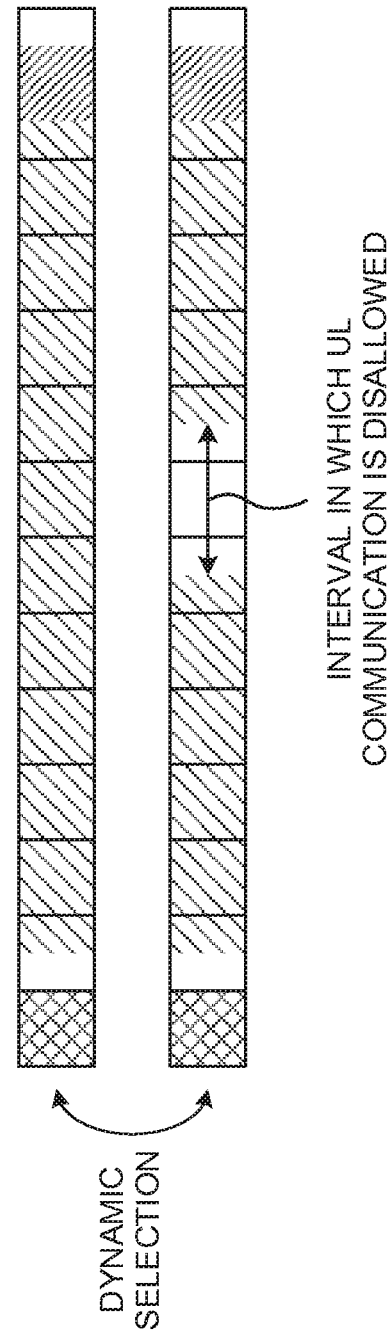

USER TERMINAL, RADIO BASE STATION AND RADIO COMMUNICATION METHOD

TECHNICAL FIELD

The present invention relates to a user terminal, a radio base station and a radio communication method in a next-generation mobile communication system.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel. 14," "LTE Rel. 15 (or later versions)," and so on).

In existing LTE systems (for example, LTE Rel. 10 and later versions), carrier aggregation (CA) to integrate a number of carriers (component carriers (CCs), cells, etc.) is introduced in order to achieve broadbandization. Each carrier is configured with the system bandwidth of LTE Rel. 8 as one unit. In addition, in CA, a number of CCs under the same radio base station (eNB (eNodeB)) are configured in a user terminal (UE (User Equipment)).

Meanwhile, in existing LTE systems (for example, LTE Rel. 12 and later versions), dual connectivity (DC), in which a number of cell groups (CGs) formed by different radio base stations are configured in a user terminal, is also introduced. Each cell group is comprised of at least one cell (CC, cell, etc.). In DC, since a number of CCs of different radio base stations are integrated, DC is also referred to as "inter-eNB CA."

Also, in existing LTE systems (for example, LTE Rel. 8 to 13), downlink (DL) communication and/or uplink (UL) communication are performed using 1-ms transmission time intervals (TTIs) (also referred to as "subframes" and so on). This 1-ms TTI is the unit of time to transmit one channel-encoded data packet, and is the processing unit in scheduling, link adaptation and so on.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

There is an expectation that future radio communication systems (for example, 5G, NR, etc.) will accommodate various services such as high-speed and large-capacity communication (eMBB (enhanced Mobile Broad Band)), massive access (mMTC (massive MTC)) from devices (user terminals) for machine-to-machine communication (M2M) such as IoT (Internet of Things) and MTC (Machine-Type Communication), and low-latency, reliable communication (URLLC (Ultra-Reliable and Low Latency Communication)), in a single framework. URLLC is required to provide a higher latency-reducing effect than eMBB and mMTC.

Thus, there is a likelihood that a number of services with different requirements for latency reduction will be co-present in future radio communication systems. Therefore, future radio communication systems are under investigation to multiplex a number of user terminals to use different numerologies in the same carrier (CC, cell, etc.).

Here, "numerology" refers to communication parameters that may be defined in the frequency direction and/or the time direction (for example, at least one of subcarrier spacing, the bandwidth, the symbol duration, the time duration of CPs (CP duration), the subframe duration, the time duration of TTIs (TTI duration), the number of symbols per TTI, the radio frame structure, the filtering process, the windowing process, and so on).

When a number of user terminals using different numerologies are multiplexed in the same carrier, it might occur that frame structures that assume separate numerologies have to be multiplexed (for example, FDM and/or TDM). However, how to multiplex frame structures of different numerologies and control communication is not decided yet, and so an appropriate control method is desired.

The present invention has been made in view of the above, and it is therefore an object of the present invention to provide a user terminal, a radio base station and a radio communication method that allow proper communication even when a number of numerologies are multiplexed in the same carrier in communication.

Solution to Problem

A user terminal, according to one aspect of the present invention, communicates in a radio communication system where frame structures of a plurality of numerologies are frequency-division-multiplexed, and has a receiving section that receives first information, which relates to a frame structure of a predetermined numerology, and second information, which specifies a period in which DL communication and/or UL communication are disallowed, or a period in which a specific communicating direction is configured, in the predetermined numerology, and a control section that controls DL receipt and/or UL transmission based on the first information and the second information.

Advantageous Effects of Invention

According to the present invention, even when a number of numerologies are multiplexed in the same carrier in communication, it is still possible to communicate properly.

BRIEF DESCRIPTION OF DRAWINGS

FIG. 2A is a diagram to show an example of a frame structure, in which the period for placing a control channel is expanded, and FIG. 2B is a diagram to show an example of a frame structure, in which expanded gap intervals are provided;

FIGS. 3A and 3B are diagrams to show examples of frame structures of different numerologies;

FIGS. 4A and 4B are diagrams to show examples, in which frame structures of different numerologies are frequency-division-multiplexed;

FIGS. 8A and 8B are diagrams to show other examples, in which frame structures for DL transmission, which use different numerologies, are frequency-division-multiplexed;

FIGS. 10A and 10B are diagrams to show other examples, in which frame structures for UL transmission, which use different numerologies, are frequency-division-multiplexed;

FIGS. 12A and 12B are diagrams to show examples of configuring control channel periods, which are assigned to frame structures per different numerology;

FIGS. 14A and 14B are diagrams to show examples of methods of providing blank periods in frame structures of predetermined numerologies for use by user terminals;

FIGS. 16A and 16B are diagrams to show examples of changing and configuring resource blanking dynamically in frame structure #1, where the SC spacing is relatively narrow (for example, 15 kHz);

DESCRIPTION OF EMBODIMENTS

Figure 1:
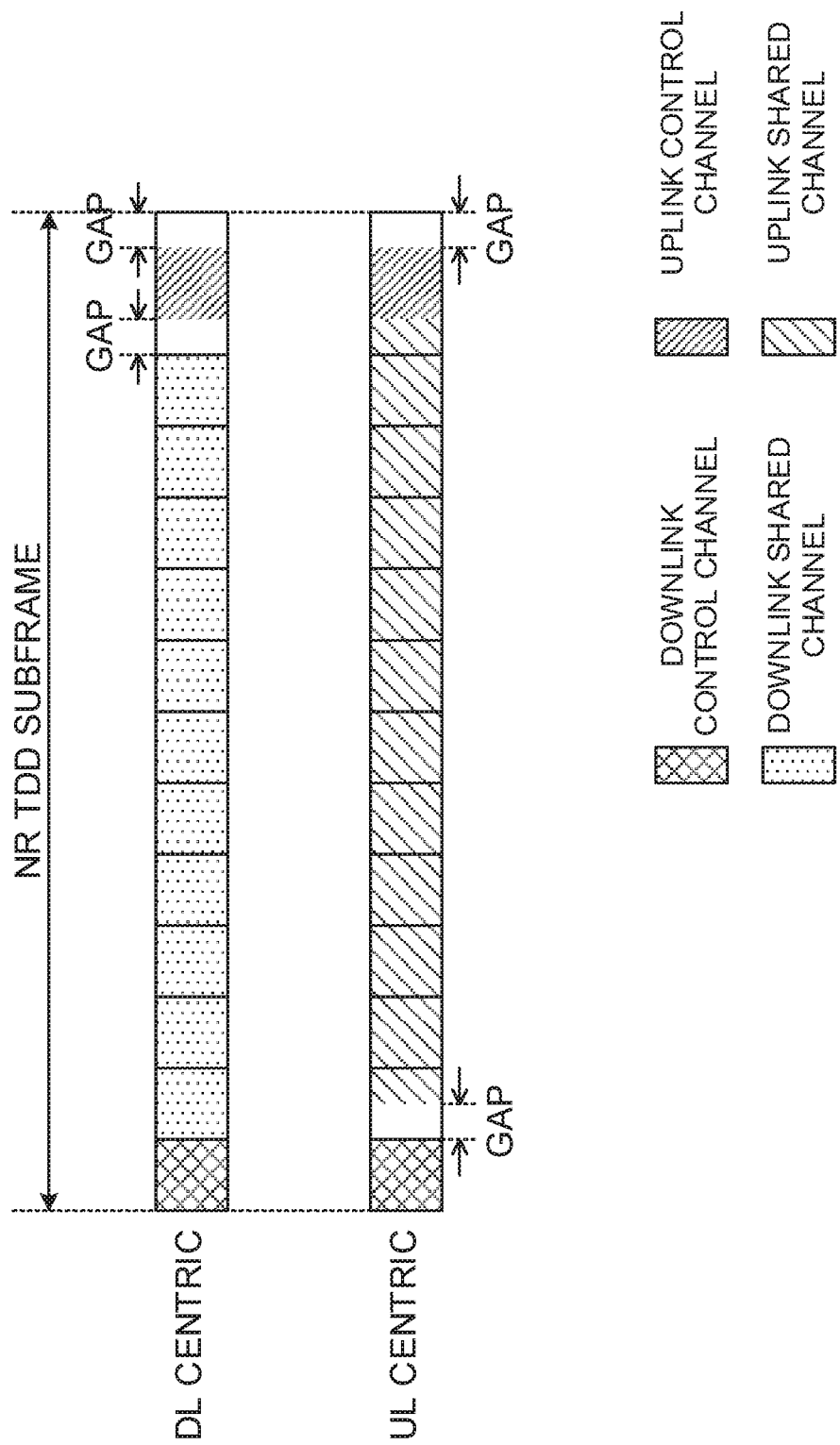
FIG. 1 is a diagram to show an example of a frame structure that is applicable in a certain numerology.

Future radio communication systems (5G/NR) are under research to introduce a number of frame structures (also referred to as "frame types," "channel structures," "subframe structures," "subframe types," "slot structures," "slot types," and so on). FIG. 1 illustrates a frame structure (here, a time structure) that can be applied to 5G/NR. Note that the frame structure shown in FIG. 1 is simply an example, and the specific details of frame structures that are applicable to the present embodiment, the number of such structures and/or others are not limited to the example shown in FIG. 1.

FIG. 1 shows an example of dividing between different channels in the time domain, but this frame structure is in no respect limiting. For example, a downlink data channel and a downlink control channel do not necessarily have to be divided in the time domain, and may be frequency-multiplexed/code-multiplexed in the same time interval (for example, symbol). Likewise, an uplink data channel and an uplink control channel do not necessarily have to be divided in the time domain, and may be frequency-multiplexed/code-multiplexed in the same time interval (for example, symbol).

FIG. 1 is a diagram to show an example of a frame structure that is applicable in a certain numerology. When downlink data (downlink data channel) is transmitted, a frame structure, in which a downlink control channel, a downlink shared channel and an uplink control channel are arranged, can be used. A user terminal controls receipt of downlink data and/or transmission of uplink data based on downlink control information that is transmitted in the downlink control channel. Also, the user terminal can feed back delivery acknowledgment signals (HARQ-ACK), in response to data that is received in the downlink shared channel, via the uplink control channel in the same time interval (for example, NR TDD subframe). Note that a gap interval may be provided between the downlink shared channel and the uplink control channel. Also, a gap interval may be provided between the uplink control channel and the time the next frame or subframe starts.

Note that, while FIG. 1 illustrates these gap intervals to be 0.5 symbols long, in actual channel structures, for example, the gap interval between the downlink shared channel and the uplink control channel and the gap interval between the downlink control channel and the uplink shared channel may be an integer multiple of the symbol duration (for example, one symbol long), and the gap interval between the uplink control channel and the time the next frame or subframe starts may be 0. In this case, in actual operation, a user terminal's uplink transmission timing may be made earlier by applying timing advance, for example, so that a gap interval can be provided between the uplink control channel and the time the next frame or subframe starts, as shown in FIG. 1.

Thus, to enable short-term communication, assignment may be performed so that transmission/receipt control (scheduling) is complete within the same subframe. This type of assignment is also referred to as "self-contained assignment." Subframes that are subject to self-contained assignment may be referred to as "self-containment subframes." Self-contained subframes may be referred to as "self-contained TTIs" or "self-contained symbol sets," or other names may be applied as well.

In self-contained subframes, a user terminal may receive DL data based on a downlink control channel, and transmit a feedback signal (for example, HARQ-ACK) in response to that DL signal. The use of self-contained subframes can realize feedback with ultra-low delay of 1 ms or less, for example, so that the latency can be reduced.

When uplink data (uplink data channel) is transmitted, a frame structure, in which a downlink control channel, an uplink shared channel and an uplink control channel are arranged can be used. In accordance with downlink control information that is transmitted in the downlink control channel, a user terminal can transmit UL signals (UL data, measurement report, etc.) in the same (or the next or a later) subframe.

In this way, to enable short-term communication, assignment may be performed so that transmission/receipt control (scheduling) is complete within the same subframe. Note that a gap interval may be provided between the downlink control channel and the uplink shared channel. Also, a gap interval may be provided between the uplink control channel and the time the next frame or subframe starts.

In a frame structure to arrange a number of channels, the order in which the channels are arranged, the length of each channel in the time direction, and the like are not limited to those of the structure shown in FIG. 1. The locations of individual channels can be switched as appropriate. For example, the period for placing the control channel may be changed, or the length of a gap interval may be changed.

FIG. 2A shows a frame structure, in which the periods where the downlink control channel and the uplink control channel are placed are expanded. By expanding the period to place the downlink control channel, the capacity of DL control information that can be transmitted within one time interval can be increased. Also, by expanding the time to place (for example, the number of symbols) the uplink control channel, it becomes easy to achieve the required quality when an uplink control signal consisting of a predetermined number of bits is transmitted, even in the uplink where transmission power is limited. FIG. 2B shows the case of expanding gap intervals. By providing longer gap intervals, the processing time it takes from receipt of data to transmission of an uplink control channel, or from receipt of a downlink control channel to transmission of an uplink shared channel, in coverage expansion and/or a downlink shared channel, can be secured, so that longer processing time is available.

Thus, future radio communication systems (5G/NR) are under study to introduce frame structures that provide an interval for making DL communication and an interval for making UL communication in a predetermined time period (for example, a subframe). Furthermore, in future radio access schemes (5G RAT), a number of numerologies (also referred to as "multiple numerologies," etc.) may be introduced to accommodate a wide range of frequency bands and support a variety of services with different requirements. Here, a numerology refers to a set of communication parameters (radio parameters) that are defined in the frequency and/or time direction. A set of communication parameters like this may include at least one of, for example, the subcarrier spacing, the bandwidth, the symbol duration, the CP duration, the TTI (subframe) duration, the number of symbols per TTI (subframe), the radio frame structure, the filtering process and the windowing process.

When "numerologies are different," this means that for example, at least one of the subcarrier spacing, the bandwidth, the symbol duration, the CP duration, the TTI (subframe) duration, the number of symbols per TTI (subframe) and the radio frame structure is different between numerologies, but this is by no means limiting. Future radio communication systems to support multiple numerologies are designed to accommodate a number of user terminals that use different numerologies.

FIG. 3 provide diagrams to show examples of frame structures that adopt different numerologies. FIG. 3A shows an example of frame structure #1, which is based on a first numerology, and in which the subcarrier spacing is relatively narrow (for example, 15 kHz), and FIG. 3B shows an example of frame structure #2, which is based on a second numerology, and in which the subcarrier spacing is relatively wide (for example, 30 kHz). Here, the subcarrier spacing of the first numerology is made 15 kHz, which is the same as the subcarrier spacing in existing LTE systems, but this is by no means limiting. Also, the subcarrier spacing of the second numerology may be configured to be N (N>1) times the subcarrier spacing of the first numerology.

Furthermore, subcarrier spacing and symbol duration are mutually reciprocal. Therefore, if the subcarrier spacing of the second numerology is made N times the subcarrier spacing of the first numerology, the symbol duration in the second numerology becomes 1/N of the symbol duration of the first numerology. Also, the structure of resource elements (REs), which are comprised of subcarriers and symbols, may also vary between the first numerology and the second numerology.

When the subcarrier spacing becomes wider, it is possible to effectively reduce the inter-channel interference caused by Doppler shifts when user terminals move, and the degradation of communication quality due to phase noise in user terminals' receivers. In particular, in high frequency bands such as several tens of GHz, the deterioration of communication quality can be prevented effectively by expanding the subcarrier spacing. Therefore, the second numerology, in which the subcarrier spacing is wider than in the first numerology, is suitable for communication in high frequency bands. Also, when the subcarrier spacing is widened, the robustness to high-speed movement also increases, so that the second numerology with broader subcarrier spacing than the first numerology is suitable for high-speed movement.

Also, when the symbol duration becomes shorter, the TTI duration, which is comprised of a predetermined number of symbols (for example, fourteen or twelve symbols), also becomes shorter, which is effective to reduce the latency (latency reduction). For example, in URLLC (Ultra-reliable and low latency communication), while the amount of data is small, latency reduction is required. For such services that impose strict requirements on latency, the second numerology with a shorter symbol duration than the first numerology is suitable. Note that TTIs (subframes) that are shorter than in existing LTE systems (for example, TTIs that are shorter than 1 ms) may be referred to as "shortened TTIs," "short TTIs," "shortened subframes," "short subframes," "partial subframes," and so on.

On the other hand, the first numerology, in which the subcarrier spacing is narrower than in the second numerology, is suitable for services that require high spectral efficiency, high-speed communication and so on, such as MBB (Mobile Broad Band). The first numerology is also suitable for massive MIMO (Massive Multiple-Input and Multiple-output) that use a large number of antenna elements.

Although not illustrated here, the number of symbols that constitute a TTI according to each numerology (which may be referred to as, for example, "NR TDD subframe," "subframe," etc.) may be the same as in existing LTE systems (for example, fourteen when normal CP is used, twelve when enhanced CP is used, and so on), or may be different. Furthermore, the unit of resource allocation (resource unit) according to each numerology may be the same as the resource block pair of existing LTE systems (which is a PRB (Physical Resource Block) pair, comprised of, for example, twelve subcarriers), or may be different. A resource unit that is different from existing LTE systems may be referred to as an "enhanced RB (eRB)" and so on.

Furthermore, symbols for use in each numerology may be OFDM (Orthogonal Frequency Division Multiplexing) symbols, or may be SC-FDMA (Single Carrier Frequency Division Multiple Access) symbols.

Also, although not illustrated, a configuration in which the subcarrier spacing is 1/N of existing LTE systems and the symbol duration is N times as large may be another example of numerology. According to this configuration, the overall symbol duration increases, so that, even when the ratio of the CP duration to the whole symbol duration is constant, the CP duration can be lengthened. This enables more robust radio communication against fading in communication paths.

Furthermore, numerologies for use by user terminals may be configured semi-statically via higher layer signaling, such as RRC (Radio Resource Control) signaling, broadcast information and so on, or may be changed dynamically via L1/L2 control channels, for example. Alternatively, numerologies for use by user terminals may be changed by using the combination of higher layer signaling and physical layer control information.

Future radio communication systems such as described above may multiplex a number of user terminals that use different numerologies on the same carrier (CC, cell, etc.). For example, a number of user terminals to use different numerologies may be multiplexed in the same carrier by frequency division multiplexing (FDM) and/or in time division multiplexing (TDM).

For example, it may be possible to frequency-division-multiplex (FDM) and/or time-division-multiplex (TDM) frame structures with varying subcarrier spacings, such as the frame structure based on the first numerology and the frame structure based on the second numerology, shown in FIG. 3. However, in this case, how to control UL communication and/or DL communication raises a problem.

FIG. 4 show examples of frequency-division-multiplexing frame structure #1 of the first numerology, in which the subcarrier spacing is relatively narrow (for example, 15 kHz), and frame structure #2 of the second numerology, in which the subcarrier spacing is relatively wide (for example, 30 kHz). Note that FIG. 4A shows a case where frame structure #1 and frame structure #2 that are used to transmit downlink data (downlink data channel) are frequency-division-multiplexed (FDM), and FIG. 4B shows a case where frame structure #1 and frame structure #2 that are used to transmit uplink data (uplink data channel), are frequency-division-multiplexed (FDM).

Generally, when TDD is used in the same carrier, communication may be controlled based on half-duplex, where UL communication and DL communication are not performed at the same time. Therefore, when different numerologies are frequency-division-multiplexed, assignment to align the communicating direction (link direction alignment) is oftentimes required in that same time period (time interval).

It then follows that, as shown in FIG. 4, when frame structures of different numerologies are frequency-division-multiplexed in the same carrier, proper half-duplex communication is not possible if different communicating directions are configured in that same time period. For example, referring to FIGS. 4A and 4B, if UL communication in frame structure #1 of the first numerology and DL communication in frame structure #2 of the second numerology overlap in the same time period and DL communication in frame structure #1 and UL communication in frame structure #2 overlap in the same time period, half-duplex communication becomes impossible.

Figure 5A:
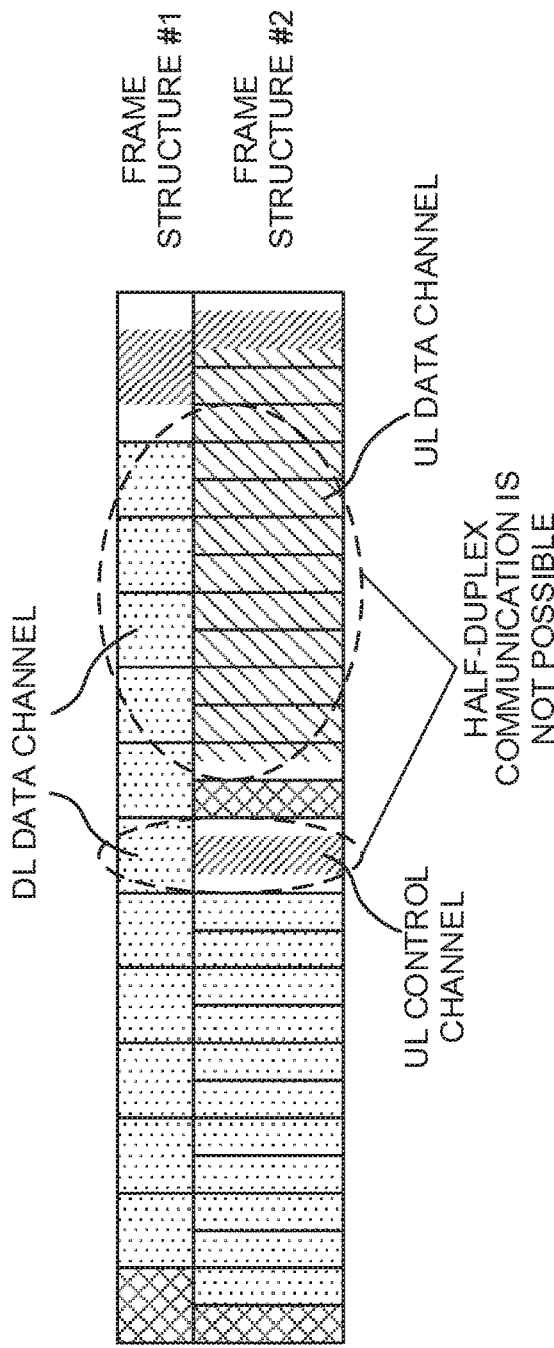
FIGS. 5A and 5B are diagrams to show other examples in which frame structures of different numerologies are frequency-division-multiplexed.
Figure 5B:
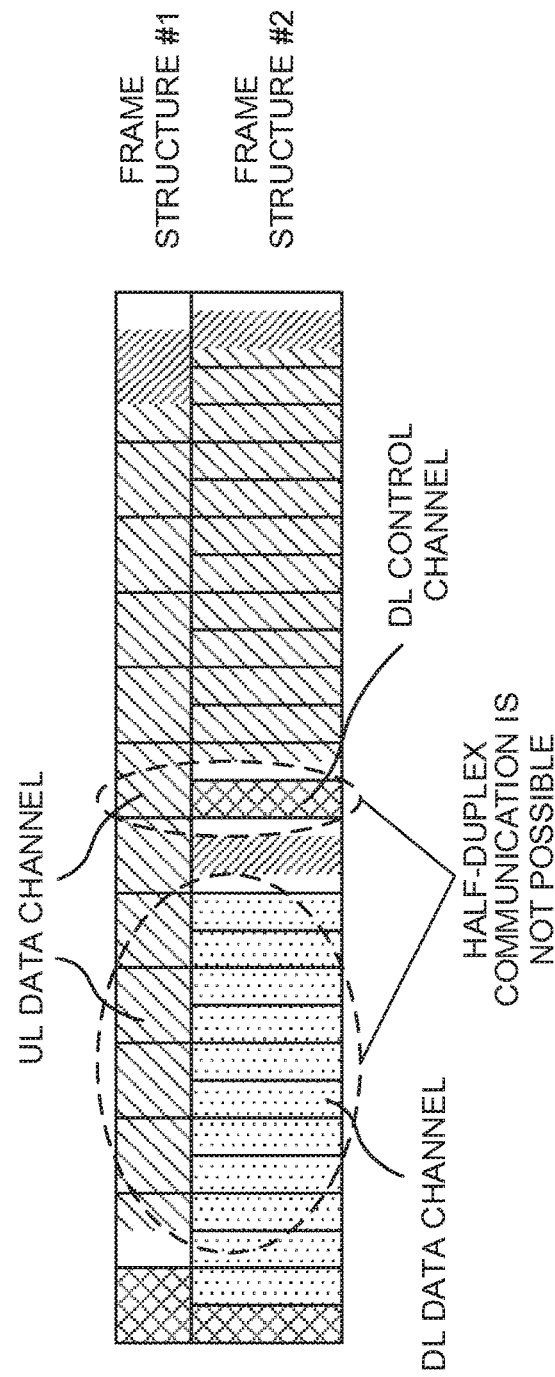

Also, as shown in FIG. 5, where there are frame structures based on different numerologies, one frame structure may be used to transmit downlink data, and the other frame structure may be used to transmit uplink data. FIG. 5A shows a case of frequency-division-multiplexing (FDM) frame structure #1, which is used to transmit downlink data, frame structure #2, which is used to transmit downlink data, and frame structure #2, which is used to transmit uplink data. FIG. 5B shows a case of frequency-division-multiplexing (FDM) frame structure #1, which is used to transmit uplink data, frame structure #2, which is used to transmit downlink data, and frame structure #2, which is used to transmit uplink data. Note that, frame structure #2 that is used to transmit downlink data and frame structure #2 that is used to transmit uplink data will be transmitted in TDD.

In this case, when DL communication (for example, downlink data channel) in frame structure #1 and UL communication (for example, uplink control channel, uplink data channel, etc.) in frame structure #2 overlap in the same time period, half-duplex communication is not possible. Also, when UL communication (for example, uplink data channel) in frame structure #1 and DL communication (for example, downlink data channel, downlink control channel, etc.) in frame structure #2 overlap in the same time period, half-duplex communication is not possible.

Thus, the present inventors have focused on the point that, if frame structures to use different numerologies are frequency-multiplexed and yet set in different communicating directions, it is not possible to communicate properly. Then, the present inventors have come up with the idea of controlling signal and/or channel allocation so that, when frame structures of different numerologies are frequency-multiplexed, different communicating directions (UL communication and DL communication) are not configured among multiple numerologies in the same time period.

According to one aspect of the present embodiment, a radio base station controls the allocation of DL signals and/or UL signals in a predetermined numerology based on the communicating direction in another numerology that is different from the predetermined numerology. Also, according to one aspect of the present embodiment, a user terminal controls DL receipt and/or UL transmission based on first information, which relates to a frame structure of a predetermined numerology, and second information, which specifies the period in which DL communication and/or UL communication are disallowed, or the period in which a specific communicating direction is configured, when the predetermined numerology is used.

Now, embodiments of the present invention will be described below detail. In the following description, a number of numerologies, implemented as different frame structures with varying subcarrier spacings, will be exemplified, but these are by no means the only frame structures that are applicable to embodiments of the present invention. In addition, a number of embodiments which will be described below may be implemented individually or in combination as appropriate.

First Embodiment

With a first embodiment of the present invention, a case will be described where the allocation of signals and/or channels is controlled taking into account the communicating directions in frame structures that correspond to different numerologies. In the following description, to illustrate frame structures of different numerologies, a case where frame structures for DL data transmission are frequencydivision-multiplexed, and a case where frame structures for UL data transmission are frequency-division-multiplexed will be described.

<FDM of Frame Structures for DL Data Transmission>

Aspect 1

Figure 6A:
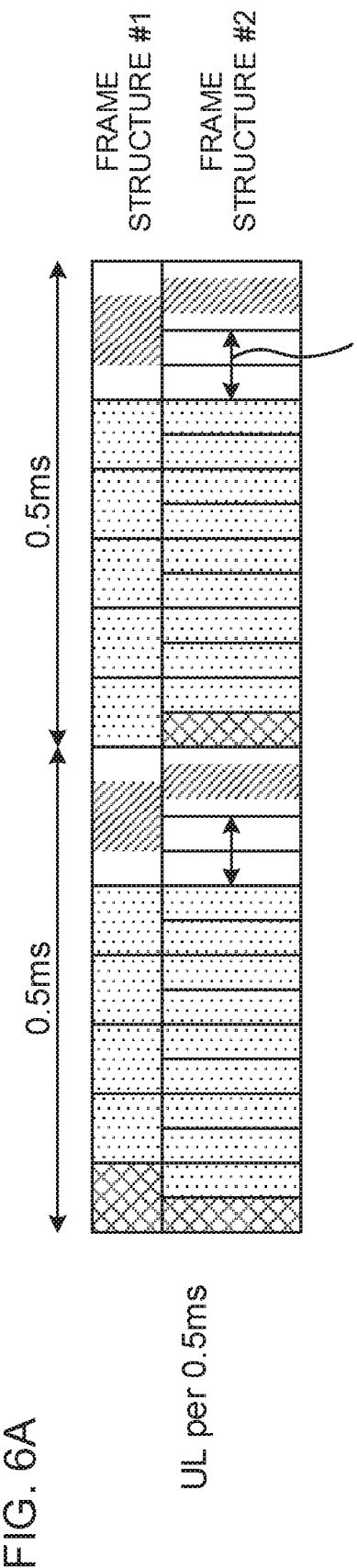
FIGS. 6A and 6B are diagrams to show examples, in which frame structures for DL transmission, which use different numerologies, are frequency-division-multiplexed.
Figure 6B:
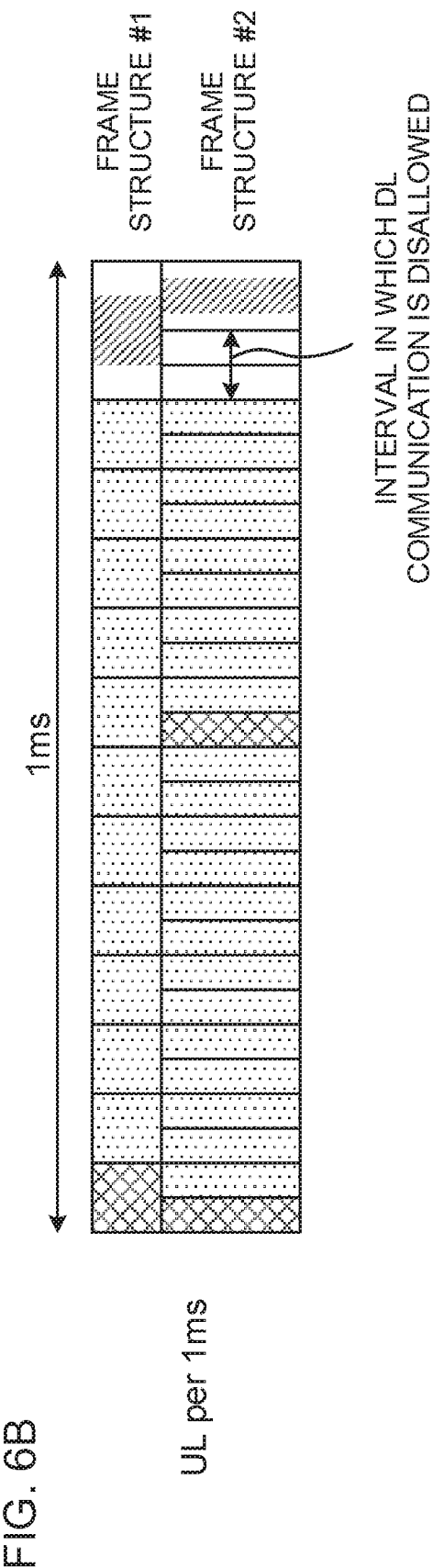

FIG. 6 show cases where frame structure #1, which is used to transmit DL data in the first numerology, and frame structure #2, which is used to transmit DL data in a second numerology, are frequency-division-multiplexed. To be more specific, FIG. 6A shows frame structures for use when transmitting an uplink control channel (for example, HARQ-ACK) every 0.5 ms, and FIG. 6B shows frame structures for use when transmitting an uplink control channel every 1 ms.

In the case shown in FIG. 6, the subcarrier spacing in frame structure #1 is 15 kHz (fourteen symbols/1 ms) and the subcarrier spacing in frame structure #2 is 30 kHz (fourteen symbols/0.5 ms), but these frame structures are by no means limiting.

As shown in FIG. 6, when frame structures for DL data transmission are frequency-division-multiplexed, it is possible to apply a configuration, in which the interval for transmitting an uplink control channel (for example, HARQ-ACK) is aligned between different numerologies. When the interval for transmitting an uplink control channel is aligned between different numerologies, the uplink control channels that are assigned to the frame structures of these numerologies overlap (are placed in the same time period) at least partly.

In this case, assuming that the radio base station communicates based on half-duplex, even if a user terminal to use frame structure #2 with wide subcarrier (SC) spacing is assigned in a time interval where a user terminal to use frame structure #1 with narrow SC spacing transmits an uplink control channel, DL transmission is not possible there. Therefore, when the radio base station communicates based on frame structure #2 with wide SC spacing, the radio base station exerts control so that, at least during the period UL communication takes place (for example, an uplink control channel is transmitted) in frame structure #1 using narrow SC spacing, DL communication is not performed (for example, no DL data channel is assigned).

The radio base station can provide a period (for example, a time interval) where no DL communication is assigned, as an interval to disallow DL communication. When doing so, in frame structure #2, the radio base station may provide a time period that serves as an interval in which DL communication is disallowed, taking into account the gap interval, in addition to the period (for example, symbol) in which UL communication is performed in frame structure #1. Control against assigning DL communication is referred to as "blanking," and an interval in which DL communication is disallowed may be referred to as a "blank period," a "blank interval" and so on.

A user terminal using frame structure #2 can perform receiving processes (for example, decoding process) on assumption that, at least in the period in which UL communication takes place in frame structure #1 using narrow SC spacing, there is no DL data. Note that information about the period where there is no DL data (interval in which DL communication is disallowed, blank period, etc.) may be reported from the radio base station to the user terminal in advance.

Aspect 2

Figure 7A:
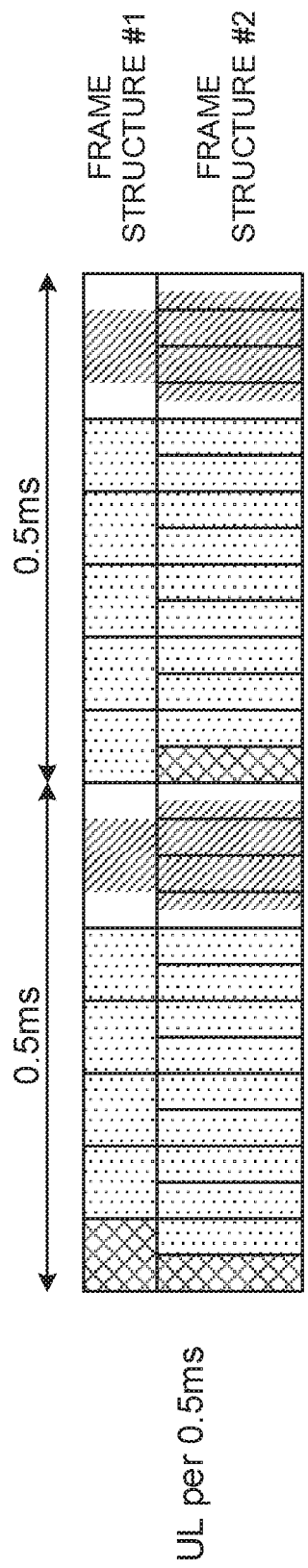
FIGS. 7A and 7B are diagrams to show other examples, in which frame structures for DL transmission, which use different numerologies, are frequency-division-multiplexed.
Figure 7B:
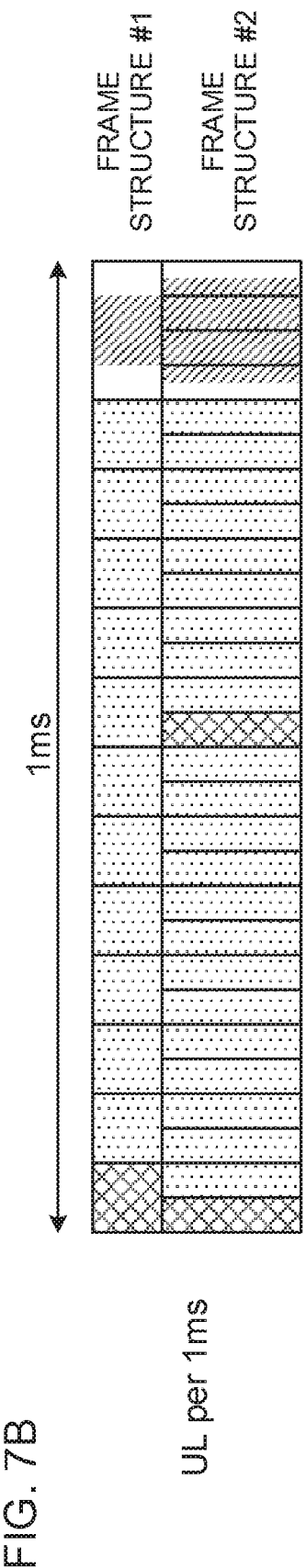

Alternatively, the periods in FIGS. 6A and 6B that are provided as intervals to disallow DL communication (blank periods) may be used for UL communication (for example, for transmitting an uplink control channel and/or an uplink data channel) (see FIG. 7). FIGS. 7A and 7B show frame structures, in which uplink control channels are allocated to the periods provided as intervals to disallow DL communication in FIGS. 6A and 6B.

In this case, at least in periods in which UL communication takes place in frame structure #1 using narrow SC spacing, the user terminal can transmit the UL control channel in frame structure #2, as commanded by the radio base station. When frame structure #2 is used, information about the interval in which communication in a specific communicating direction (here, UL communication) takes place (the interval in which DL communication is disallowed) may be reported from the radio base station to the user terminal in advance.

In this way, the time periods in frame structure #2 where DL communication is restricted are used as resources for UL communication, so that the efficiency of the use of resources can be improved. Also, when frame structure #2 is used, it is possible to lengthen the interval for transmitting a UL control channel (by increasing the number of transmission symbols or lengthening the duration of transmission symbols). This makes it possible to expand the area (coverage) where the UL control channel's quality requirement is fulfilled, increase the payload of uplink control information (UCI) that can be transmitted in the UL control channel, and so on.

Aspect 3

Also, as shown in FIG. 8, when frame structures for DL data transmission are frequency-division-multiplexed, transmission intervals for an uplink control channel (for example, HARQ-ACK) may be provided on a per numerology basis. FIG. 8 show cases where an uplink control channel is transmitted every 1 ms in frame structure #1, in which the SC spacing is narrow, and where an uplink control channel is transmitted every 0.5 ms in frame structure #2, in which the SC spacing is wide.

Assuming that the radio base station communicates based on half-duplex, during the time interval in which a user terminal to use subframe structure #2 with wide subcarrier (SC) spacing transmits an uplink control channel, the radio base station cannot transmit DL data for a user terminal that uses frame structure #1 of narrow SC spacing. So, when the radio base station communicates in frame structure #1 using narrow SC spacing, the radio base station exerts control so that DL communication is not performed (for example, no DL data channel is assigned) at least during the period UL communication takes place (for example, an uplink control channel is transmitted) in frame structure #2 using wide SC spacing (see FIG. 8A).

Similarly, assuming that the radio base station communicates based on half-duplex, during the time interval in which the user terminal to use subframe structure #1 with narrow subcarrier (SC) spacing transmits an uplink control channel, the radio base station cannot transmit DL data for the user terminal that uses frame structure #2 of wide SC spacing. So, when the radio base station communicates in frame structure #2 using wide SC spacing, the radio base station exerts control so that the DL data channel is not assigned at least during the period the uplink control channel is transmitted in frame structure #1 using narrow SC spacing (see FIG. 8A).

In each frame structure, the radio base station can provide a period where no DL communication is assigned, as an interval to disallow DL communication. When doing so, in each frame structure, the radio base station may provide a time period that serves as an interval in which DL communication is disallowed, taking into account the gap interval, in addition to the period in which UL communication takes place in the other frame structure.

Based on information that is reported from the radio base station (for example, information about the interval in which DL communication is disallowed), the user terminal can perform receiving processes (for example, decoding process) on assumption that there is no DL data in a predetermined time interval.

Alternatively, the user terminal may use the period that is provided as an interval to disallow DL communication in frame structure #2 of FIG. 8A for UL communication (for example, uplink control channel and/or uplink data channel) (see FIG. 8B). By this means, the time periods in frame structure #2 where DL communication is restricted can be used as resources for UL communication, so that the efficiency of the use of the resource can be improved.

<FDM of Frame Structures for UL Data Transmission>

Aspect 1

Figure 9A:
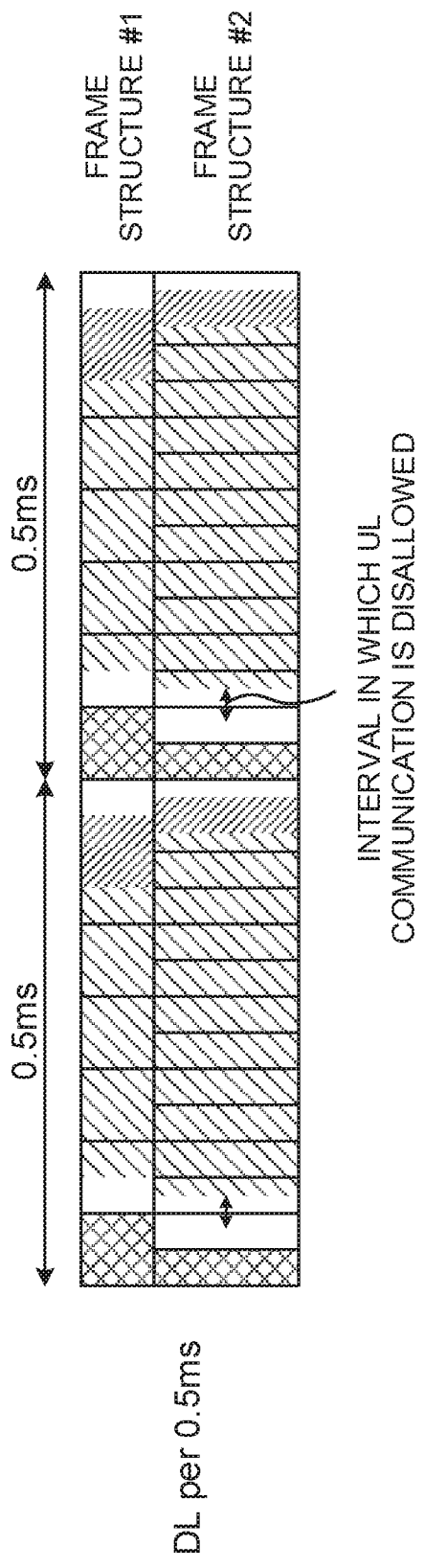
FIGS. 9A and 9B are diagrams to show examples, in which frame structures for UL transmission, which use different numerologies, are frequency-division-multiplexed.
Figure 9B:
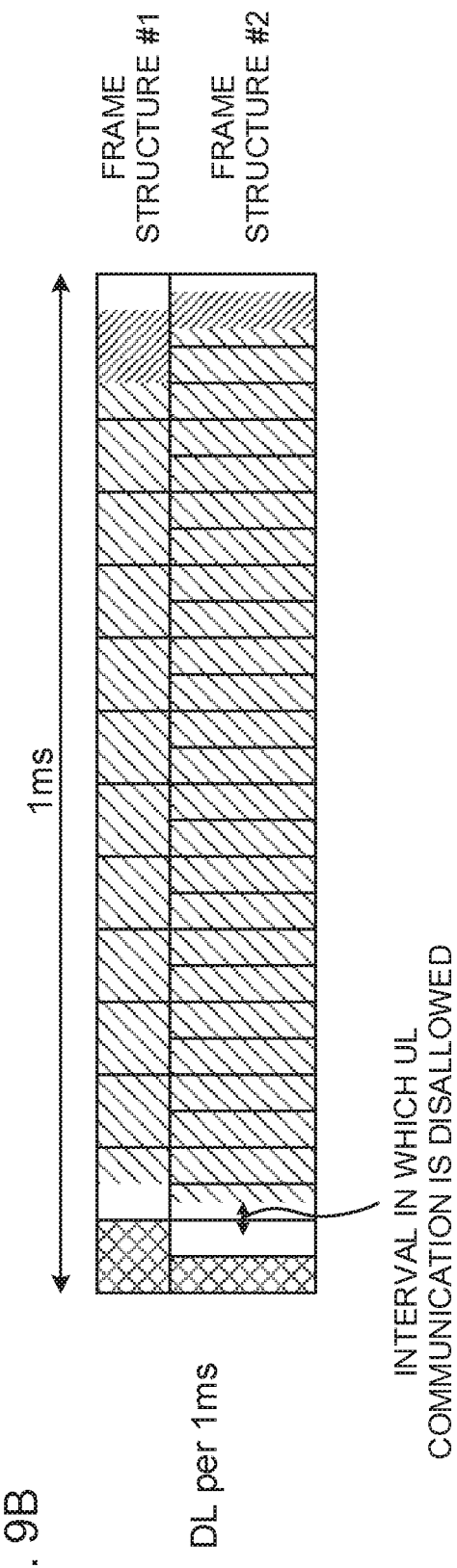

FIG. 9 show cases where frame structure #1, which is used to transmit UL data in the first numerology, and frame structure #2, which is used to transmit UL data in a second numerology, are frequency-division-multiplexed. To be more specific, FIG. 9A shows frame structures for use when transmitting a downlink control channel every 0.5 ms, and FIG. 9B shows frame structures for use when transmitting a downlink control channel every 1 ms.

In the case shown in FIG. 9, the subcarrier spacing in frame structure #1 is 15 kHz (fourteen symbols/1 ms), and the subcarrier spacing in frame structure #2 is 30 kHz (fourteen symbols/0.5 ms), but these frame structures are by no means limiting.

As shown in FIG. 9, when frame structures for UL data transmission are frequency-division-multiplexed, it is possible to apply a configuration, in which the interval for transmitting a downlink control channel (for example, DL-CCH) is aligned between different numerologies. When the interval for transmitting a downlink control channel is aligned between different numerologies, downlink control channels that are allocated to frame structures of different numerologies overlap (are placed in the same time period) at least partly.

In this case, assuming that the radio base station communicates based on half-duplex, even if a user terminal to use frame structure #2 with wide subcarrier (SC) spacing is assigned in a time interval where a user terminal to use frame structure #1 with narrow SC spacing receives a downlink control channel, the radio base station cannot receive UL from that user terminal. Therefore, when the radio base station communicates based on frame structure #2 with wide SC spacing, the radio base station exerts control so that, at least during the period DL communication takes place (for example, a downlink control channel is transmitted) in frame structure #1 using narrow SC spacing, UL communication is not performed (for example, no UL data channel is assigned).

The radio base station can provide a period (for example, a time interval) where no UL communication is assigned, as an interval to disallow UL communication. When doing so, in frame structure #2, the radio base station may provide a time period that serves as an interval in which UL communication is disallowed, taking into account the gap interval, in addition to the period (for example, symbol) in which DL communication is performed in frame structure #1. Control against assigning UL communication is referred to as "blanking," and an interval in which UL communication is disallowed may be referred to as a "blank period," a "blank interval" and so on.

A user terminal using frame structure #2 can perform transmission processes (for example, mapping process) so that, at least in the period in which DL communication takes place in frame structure #1 using narrow SC spacing, no UL data is mapped. Note that information about the period in which no UL data is mapped (the interval in which UL communication is disallowed, blank period, etc.) may be reported from the radio base station to the user terminal in advance.

Aspect 2

Alternatively, the periods in FIGS. 9A and 9B that are provided as intervals to disallow UL communication (blank periods) may be used for DL communication (for example, for transmitting a downlink control channel and/or a downlink data channel) (see FIG. 10). FIGS. 10A and 10B show frame structures, in which downlink control channels are allocated to the periods provided as intervals to disallow UL communication in FIGS. 9A and 9B.

In this case, at least in periods in which DL communication takes place in frame structure #1 using narrow SC spacing, the user terminal can transmit the DL control channel in frame structure #2, as commanded by the radio base station. When frame structure #2 is used, information about the interval in which communication in a specific communicating direction (here, DL communication) takes place (the interval in which UL communication is disallowed) may be reported from the radio base station to the user terminal in advance.

In this way, the time periods in frame structure #2 where UL communication is restricted are used as resources for DL communication, so that the efficiency of the use of resources can be improved. Also, when frame structure #2 is used, it is possible to increase the capacity of a DL control channel by lengthening the interval for transmitting the DL control channel (by increasing the number of transmission symbols or lengthening the duration of transmission symbols). By this means, it is possible to increase the number of user terminals to be scheduled in the same subframe, or increase the amount of resources to use to transmit DL scheduling information (DCI) to a certain user terminal and improve its communication quality.

Aspect 3

Also, as shown in FIG. 11, when frame structures for UL data transmission are frequency-division-multiplexed, transmission intervals for a downlink control channel may be provided on a per numerology basis. FIG. 11 shows a case where a downlink control channel is transmitted every 1 ms in frame structure #1, in which the SC spacing is narrow, and a case where a downlink control channel is transmitted every 0.5 ms in frame structure #2, in which the SC spacing is wide.

Assuming that the radio base station communicates based on half-duplex, during the time interval in which a user terminal to use subframe structure #2 with wide subcarrier (SC) spacing transmits a downlink control channel, the radio base station cannot receive UL data from a user terminal that uses frame structure #1 of narrow SC spacing. So, when the radio base station communicates in frame structure #1 using narrow SC spacing, the radio base station exerts control so that UL communication is not performed (for example, no UL data channel is assigned) at least during the period DL communication takes place (for example, a downlink control channel is transmitted) in frame structure #2 using wide SC spacing (see FIG. 11A).

Similarly, assuming that the radio base station communicates based on half-duplex, during the time interval in which the user terminal to use subframe structure #1 with narrow subcarrier (SC) spacing transmits a downlink control channel, the radio base station cannot receive UL data from the user terminal that uses frame structure #2 of wide SC spacing. So, when the radio base station communicates in frame structure #2 using wide SC spacing, the radio base station exerts control so that the UL data channel is not assigned at least during the period the downlink control channel is transmitted in frame structure #1 using narrow SC spacing (see FIG. 11A).

In each frame structure, the radio base station can provide a period where no UL communication is assigned, as an interval to disallow UL communication. When doing so, in each frame structure, the radio base station may provide a time period that serves as an interval in which UL communication is disallowed, taking into account the gap interval, in addition to the period in which DL communication takes place in the other frame structure.

Based on information that is reported from the radio base station (for example, information about the interval in which UL communication is disallowed), the user terminal can perform transmission processes (for example, mapping) on assumption that there is no UL data in a predetermined time interval.

Figure 11A:
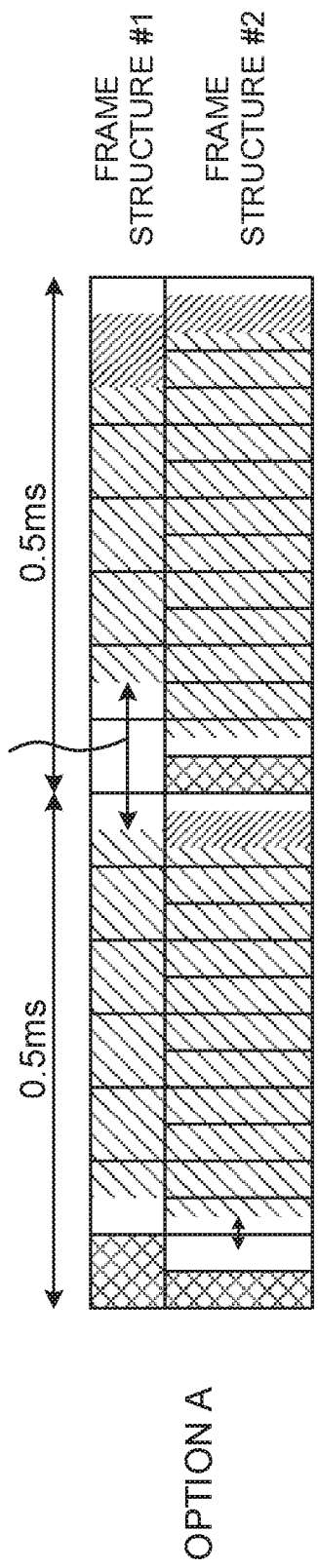
FIGS. 11A and 11B are diagrams to show other examples, in which frame structures for UL transmission, which use different numerologies, are frequency-division-multiplexed.
Figure 11B:
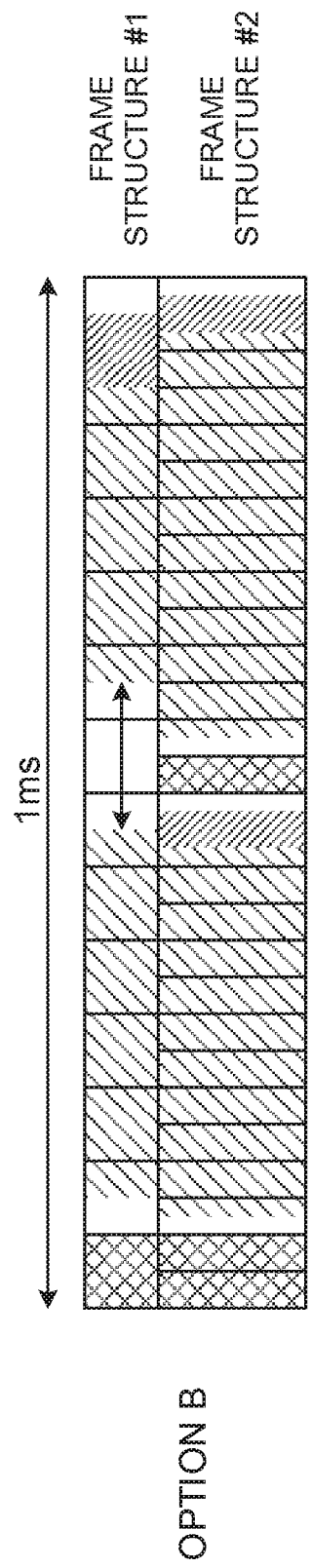

Alternatively, the user terminal may use the period that is provided as an interval to disallow UL communication in frame structure #2 of FIG. 11A for DL communication (for example, uplink control channel and/or uplink data channel) (see FIG. 11B). By this means, the time periods in frame structure #2 where UL communication is restricted can be used as resources for DL communication, so that the efficiency of the use of the resource can be improved.

Variation

When frame structures to use different numerologies are frequency-division-multiplexed, allocation of DL data (frame structure for DL data transmission) and allocation of UL data (frame structure for UL data transmission) can be controlled based on the cycle in which a predetermined frame structure is assigned. Control can be exerted so that, for example, a frame structure with wide SC spacing is selected as a predetermined subframe structure, and DL data allocation and UL data allocation are switched in the cycle this frame structure with wide SC spacing is assigned.

FIG. 12 show cases where, when frame structure #1, in which the SC spacing is narrow, and frame structure #2, in which the SC spacing is wide, are frequency-division-multiplexed, DL data allocation and UL data allocation are switched in the cycle in which frame structure #2 with wide SC spacing is assigned (here, 0.5 ms). FIG. 12A shows a case of switching from a frame structure for UL data transmission to a frame structure for DL data transmission, and FIG. 12B shows a case of switching from a frame structure for DL data transmission to a frame structure for UL data transmission.

That is, in each numerology, a frame structure for DL data transmission and a frame structure for UL data transmission are switched based on the cycle in which a predetermined frame structure is assigned (for example, a frame structure with wide SC spacing). By this means, it is possible to avoid frequency-division-multiplexing a frame structure for DL data transmission and a frame structure for UL data transmission and frequency-division-multiplex frame structures for DL data transmission and/or frequency-division-multiplex frame structures for UL data transmission (see FIG. 5). As a result, intervals in which UL communication and/or DL communication are disallowed can be reduced, and the efficiency of the use of resource can be improved.

Note that frequency-division-multiplexing of frame structures for DL data transmission and/or frequency-division-multiplexing of frame structures for UL data transmission can be controlled as shown in FIG. 6 to FIG. 11.

Second Embodiment

With a second embodiment of the present invention, the method of reporting/providing intervals in which UL communication and/or DL communication are disallowed (see FIG. 6 and FIG. 9 above) or intervals in which transmission in specific communicating directions is permitted (see FIG. 7 and FIG. 10 above), by taking into account frame structures of different numerologies, will be described. Note that, in the description below, the operation for disallowing UL communication and/or DL communication and the operation for configuring transmission in a specific communicating direction will be referred to as "blanking." Also, an interval in which UL communication and/or DL communication are disallowed and/or an interval in which transmission is permitted in a specific communicating direction will be each referred to as a "blank period" or a "blank interval."

Although examples have been described above with the first embodiment where two kinds of numerologies are multiplexed, depending on the communicating environment, the number of numerologies to be multiplexed and the frame structures may change statically, semi-statically or dynamically. In this case, the symbol pattern to require blanking may vary depending on the type of numerology, the cycle of transmitting a downlink control channel, the cycle of transmitting an uplink control channel (for example, HARQ-ACK) and so on.

Also, given that blanking is necessary only frame structures of different numerologies are frequency-division-multiplexed, executing blanking all the time (for example, never making transmission in intervals in which transmission is disallowed) might lead to increased overhead and a deterioration of throughput.

So, information regarding blanking is reported from a radio base station to a user terminal, to control the transmitting/receiving operations in the user terminal. The information regarding blanking may be any information that can specify in which periods DL communication and/or UL communication are disallowed, or in which periods specific communicating directions are configured, based on the numerology used by the user terminal. For example, given a frame structure that is based on the numerology used by the user terminal, the interval and/or the cycle in which UL communication is disallowed, the interval and/or the cycle in which DL communication is disallowed and so on are reported to the user terminal as blanking information. In addition, information to command communication in specific communicating directions in intervals in which UL communication and/or DL communication are disallowed may be used as blanking information.

Alternatively, a frame structure that is based on another numerology, which a user terminal does not use but which is configured in the same carrier may be reported to the user terminal as blanking information. In this case, the user terminal can compare the frame structure which the user terminal itself uses, with the other frame structure, and specify blank periods.

Figure 13A:
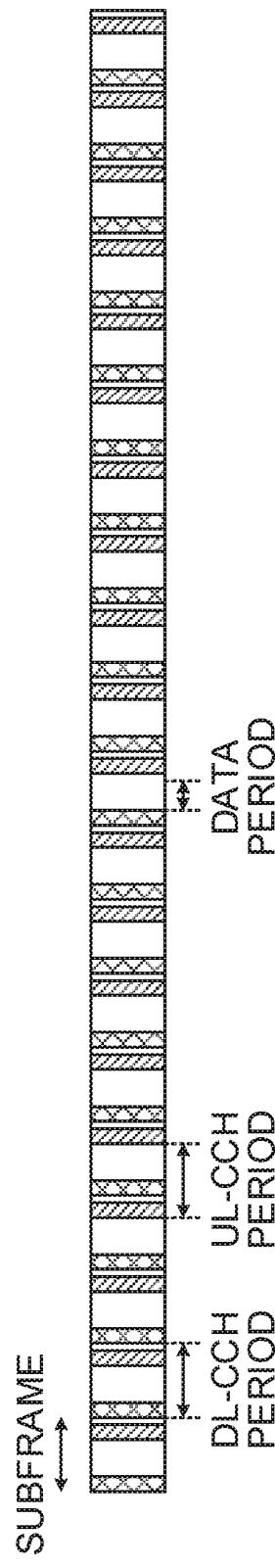
FIGS. 13A and 13B show examples of frame structures of predetermined numerologies for use by user terminals.
Figure 13B:
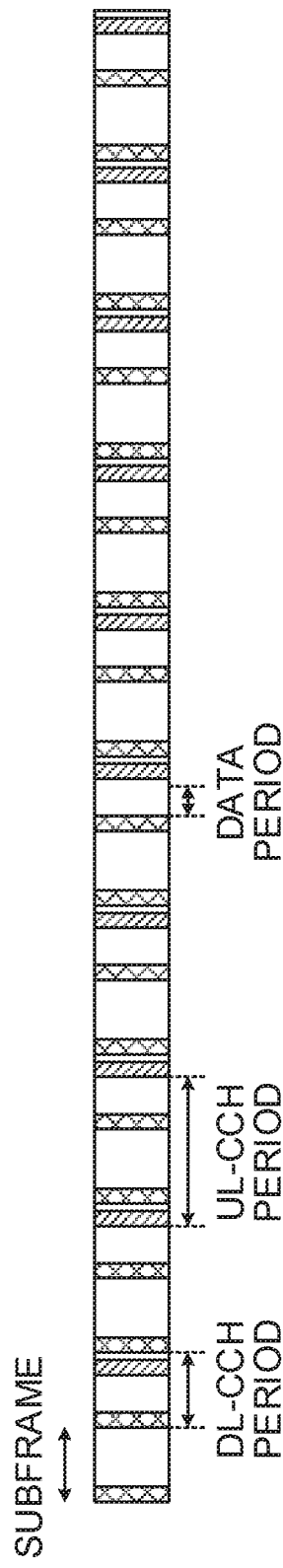

FIG. 13 illustrate frame structures of given numerologies, which are for use by user terminals. FIG. 13A shows a case where a downlink control channel and an uplink control channel are provided at predetermined time intervals (here, per subframe). FIG. 13B shows a case where a downlink control channel is provided every subframe and an uplink control channel is provided every two subframes.

FIG. 14 are diagrams to show examples of methods of providing blank periods (for example, intervals in which transmission is disallowed) in frame structures of predetermined numerologies used by user terminals. FIG. 14A shows a case where, in FIG. 13A, intervals in which DL communication is disallowed are provided at predetermined time intervals (here, per subframe). FIG. 14B shows a case where, in FIG. 13B, intervals in which DL communication is disallowed are provided every two subframes (per subframe where an uplink control channel is allocated). Note that FIG. 14 assume cases where a user terminal uses frame structure #2.

The radio base station reports information about the frame structure which the user terminal uses when communicating, and information about blanking, to the user terminal, through higher layer signaling (at least one of a broadcast signal, system information and RRC control information). The information about the frame structure includes at least one of the subcarrier spacing, the cycle to switch between UL and DL (for example, a frame structure for UL data transmission and a frame structure for DL data transmission), the duration of the data interval, the cycle of the downlink control channel and the cycle of the uplink control channel.

Furthermore, the information about blanking includes one or both of intervals (for example, symbols) and the cycle in which DL communication and/or UL communication are disallowed. Also, the information about blanking may include information to command transmission in a specific communicating direction in intervals (for example, symbols) in which transmission in a specific communicating direction is disallowed.

Alternatively, the radio base station reports information about the frame structure which the user terminal uses when communicating, and information about a frame structure which this user terminal does not use to communicate, but which nevertheless may be used in the same carrier may be reported to the user terminal through higher layer signaling (which is at least one of a broadcast signal, system information and RRC control information). For example, the radio base station can report information about frame structure #2 and information about frame structure #1, which can be configured in the same subcarrier, to a user terminal that communicates using frame structure #2.

The user terminal can identify blank periods by comparing the information about the frame structure which this user terminal itself uses (for example, frame structure #2) with the information about the frame structure that may be used in the same carrier (for example, frame structure #1). For example, the user terminal compares the frame structure which this user terminal itself uses with the other frame structure, and controls transmission and receipt on assumption that, when there is a time interval in which the communicating directions do not match, UL communication and/or DL communication are limited based on predetermined conditions.

By thus reporting information about blanking to the user terminal and providing intervals in which DL communication and/or UL communication are disallowed, it is possible to improve the efficiency of the use of resources, compared to the case where blanking is always performed.

Also, the radio base station can command the user terminal to change the configuration of resource blanking and/or the number of symbols to use for data transmission, dynamically, implicitly or explicitly.

The radio base station reports information that can identify the resources to be made blank (for example, intervals and/or the cycle in which DL communication is disallowed, intervals and/or the cycle in which UL communication is disallowed, etc.) to the user terminal, in advance, through higher layer signaling and the like. For example, the radio base station can configure blanking candidates, where symbols to be made blank are specified, in a number of user terminals. Moreover, when there is an implicit indication, the user terminal determines whether or not blanking resources are provided, based on the size of transport blocks (TBs) scheduled, the number of uplink control channel symbols, the locations of symbols, and so on.

Alternatively, when there is an explicit indication, the user terminal may determine whether or not blanking resources are provided, based on a reporting bit, which is contained in downlink control information transmitted from the radio base station and which indicates whether or not blanking resource are inserted.

Figure 15A:
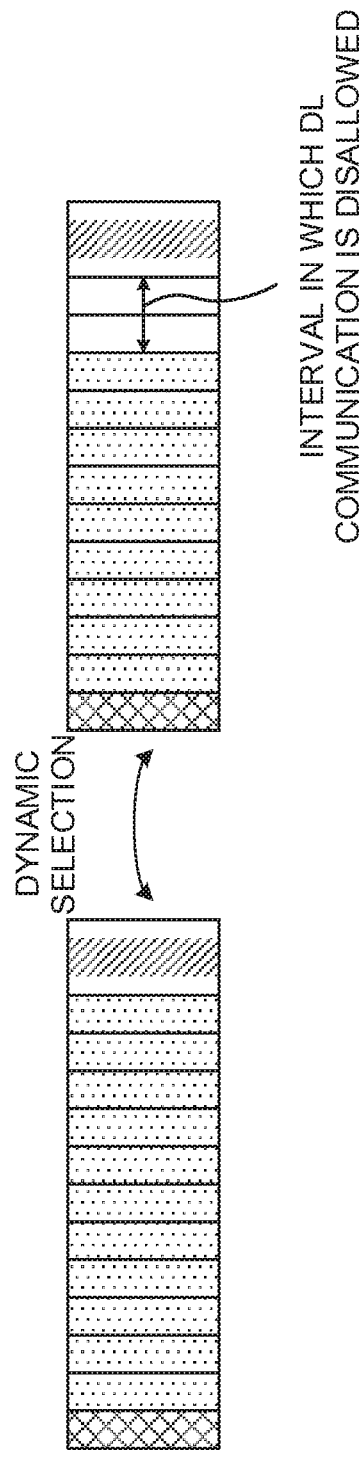
FIGS. 15A and 15B are diagrams to show examples of changing and configuring resource blanking dynamically in frame structure #2, where the SC spacing is relatively wide (for example, 30 kHz)
Figure 15B:
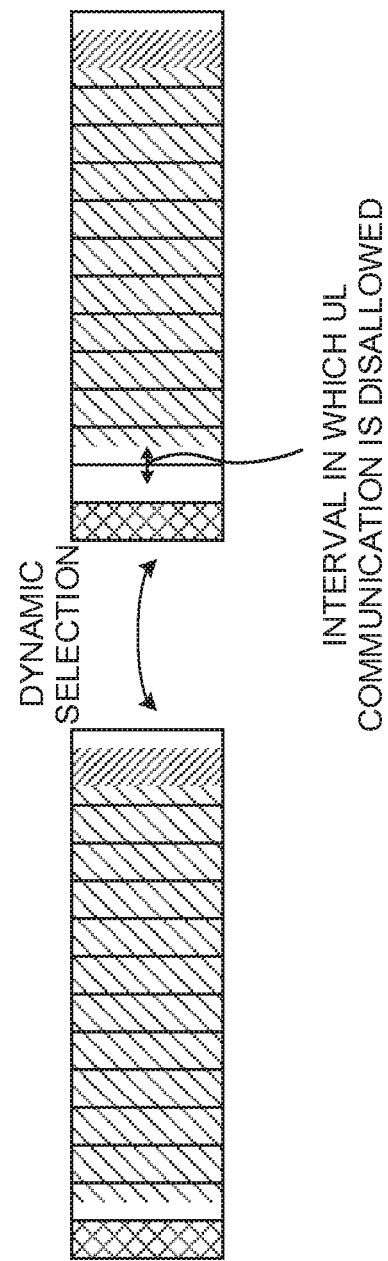

FIG. 15 show examples of changing and configuring resource blanking dynamically, in frame structure #2 where the subcarrier spacing is relatively wide (for example, 30 kHz). FIG. 15A shows frame structure #2 for DL transmission, and FIG. 15B shows frame structure #2 for UL transmission. FIG. 16 show examples of changing and configuring resource blanking dynamically, in frame structure #1 where the subcarrier spacing is relatively narrow (for example, 15 kHz). FIG. 16A shows frame structure #1 for DL transmission, and FIG. 16B shows frame structure #1 for UL transmission.

As shown in FIG. 15A and FIG. 16A, the user terminal can identify the interval in which DL communication (for example, receipt of a DL data channel) is disallowed, which is dynamically changed and provided, based on implicit or explicit reporting from the radio base station. Also, as shown in FIG. 15B and FIG. 16B, the user terminal can identify the interval in which UL communication (for example, transmission of a UL data channel) is disallowed, which is dynamically changed and provided, based on implicit or explicit reporting from the radio base station.

In this way, by controlling whether or not intervals in which UL transmission is disallowed and/or intervals in which DL transmission is disallowed are provided, on a dynamic basis, it is possible to provide periods in which transmission is disallowed, only when different frame structures are frequency-division-multiplexed, so that the efficiency of the use of resource can be improved.

Figure 17A:
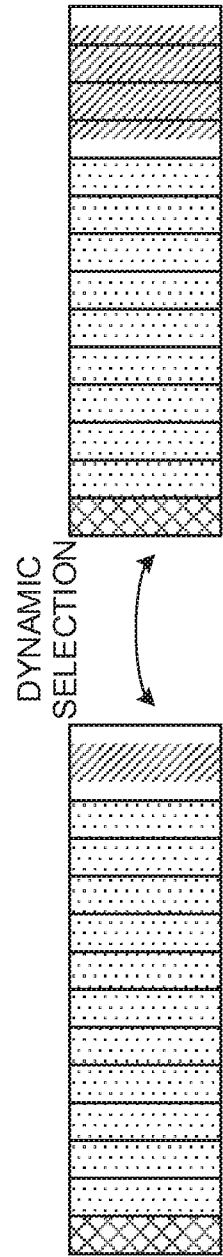
FIGS. 17A and 17B are diagrams to show examples of controlling transmission by switching the communicating direction dynamically in predetermined symbols in frame structure #2, where the SC spacing is relatively wide (for example, 30 kHz)
Figure 17B:
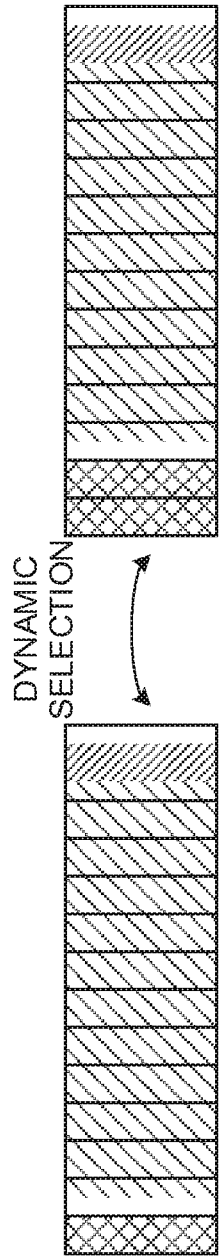

Alternatively, the time intervals (for example, the number of symbols) for a downlink control channel and/or an uplink control channel may be switched and provided without increasing blanking (see FIG. 17). FIG. 17 show examples of controlling transmission by switching the communicating direction dynamically in predetermined symbols, in frame structure #2 where the SC spacing is relatively wide (for example, 30 kHz). FIG. 17A shows frame structure #2 for DL transmission, and FIG. 17B shows frame structure #2 for UL transmission.

As shown in FIG. 17A, the user terminal controls DL communication (for example, receipt of a DL data channel) and UL communication (for example, transmission of an uplink control channel) to be switched dynamically in a predetermined symbol, based on implicit or explicit reporting from the radio base station. Also, as shown in FIG. 17B, the user terminal controls UL communication (for example, transmission of a UL data channel) and DL communication (for example, receipt of a downlink control channel) to be switched dynamically in a predetermined symbol, based on implicit or explicit reporting from the radio base station.

Thus, when transmission in a specific communicating direction is disallowed in a given period, transmission in a different communicating direction is configured, so that it is possible to reduce the time intervals in which no transmission takes place, and improve the efficiency of the use of resources. For example, the capacity of a downlink control channel can be increased by allocating the downlink control channel in intervals in which UL communication is disallowed. Also, the performance of an uplink control channel can be enhanced by allocating the uplink control channel in intervals in which DL communication is disallowed.

(Radio Communication System)

Now, the structure of a radio communication system according to the present embodiment will be described below. In this radio communication system, each radio communication method according to the above-described embodiments is employed. Note that the radio communication method according to each embodiment may be used alone or may be used in combination.

Figure 18:
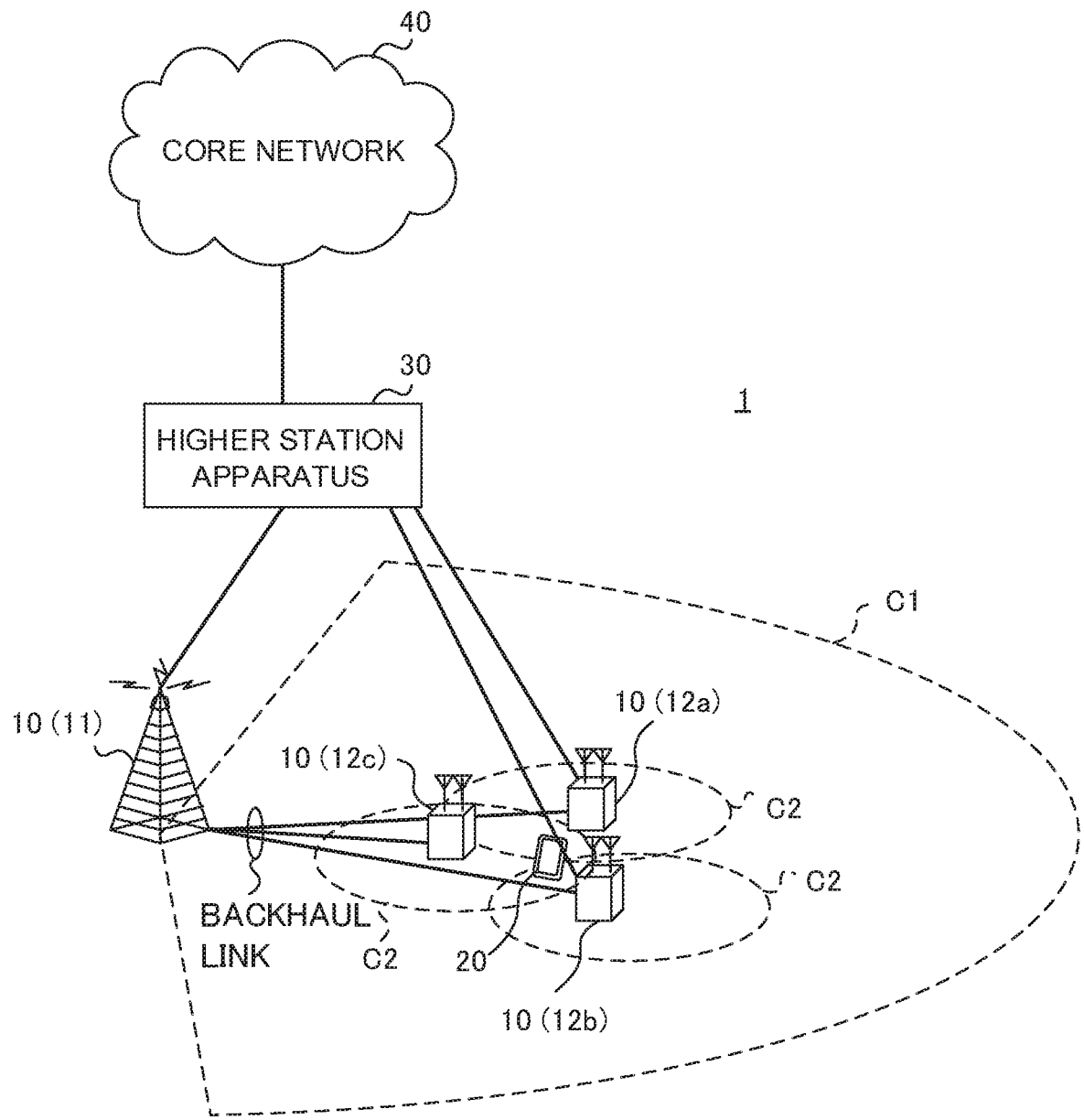
FIG. 18 is a diagram to show an example of a schematic structure of a radio communication system according to one embodiment of the present invention.

FIG. 18 is a diagram to show an example of a schematic structure of a radio communication system according to the present embodiment. A radio communication system 1 can adopt carrier aggregation (CA) and/or dual connectivity (DC) to group a number of fundamental frequency blocks (component carriers) into one, where the LTE system bandwidth (for example, 20 MHz) constitutes one unit. Note that the radio communication system 1 may be referred to as "SUPER 3G," "LTE-A (LTE-Advanced)," IMT-Advanced," "4G," "5G," "FRA (Future Radio Access)," "NR (New Rat)" and so on.

The radio communication system 1 shown in FIG. 18 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A configuration in which different numerologies are applied between cells may be adopted. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a number of cells (CCs) (for example, two or more CCs). Furthermore, the user terminals can use license band CCs and unlicensed band CCs as a number of cells. Note that it is possible to adopt a configuration including a TDD carrier, in which shortened TTIs are applied to some of a number of cells.

Between the user terminals 20 and the radio base station 11, communication is carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a number of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a number of terminals to use mutually different bands. Note that the uplink and downlink radio access schemes are not limited to the combinations of these, and OFDMA may be used in UL.

In the radio communication system 1, a DL data channel (PDSCH (Physical Downlink Shared CHannel), which is also referred to as "DL shared channel" and so on), which is used by each user terminal 20 on a shared basis, a broadcast channel (PBCH (Physical Broadcast CHannel)), L1/L2 control channels and so on are used as DL channels. User data, higher layer control information and SIBs (System Information Blocks) are communicated in the PDSCH. Also, the MIB (Master Information Block) is communicated in the PBCH.

The L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement information (ACK/NACK) in response to the PUSCH is communicated by the PHICH. The EPDCCH is frequency-division-multiplexed with the PDSCH (downlink shared data channel) and used to communicate DCI and so on, like the PDCCH.

In the radio communication system 1, a UL data channel (PUSCH (Physical Uplink Shared CHannel), which is also referred to as "UL shared channel" and so on), which is used by each user terminal 20 on a shared basis, a UL control channel (PUCCH (Physical Uplink Control Channel)), a random access channel (PRACH (Physical Random Access CHannel)) and so on are used as UL channels. User data, higher layer control information and so on are communicated by the PUSCH. Uplink control information (UCI), including at least one of delivery acknowledgment information (ACK/NACK) and radio quality information (CQI), is communicated via the PUSCH or the PUCCH. By means of the PRACH, random access preambles for establishing connections with cells are communicated.

(Radio Base Station)

Figure 19:
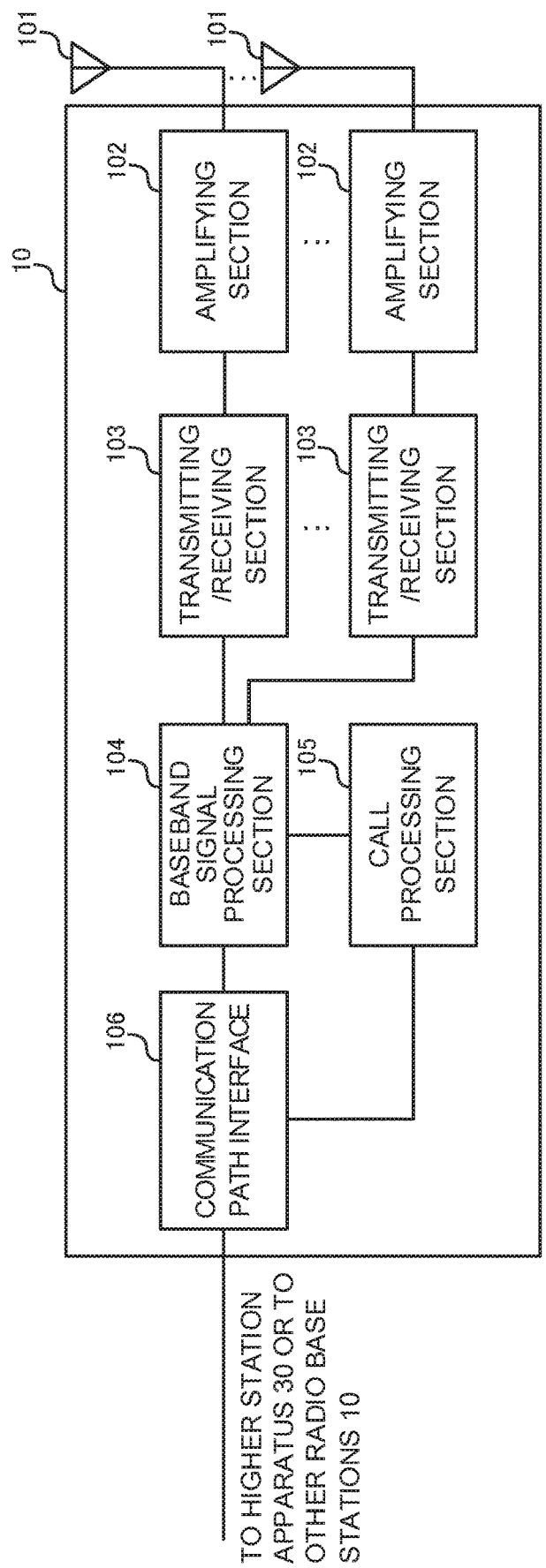
FIG. 19 is a diagram to show an example of an overall structure of a radio base station according to one embodiment of the present invention.

FIG. 19 is a diagram to show an example of an overall structure of a radio base station according to the present embodiment. A radio base station 10 has a number of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

DL data to be transmitted from the radio base station 10 to a user terminal 20 is input from the higher station apparatus 30 to the baseband signal processing section 104, via the communication path interface 106.

In the baseband signal processing section 104, the DL data is subjected to transmission processes, including a PDCP (Packet Data Convergence Protocol) layer process, division and coupling of user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, DL control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit DL signals (for example, a DL control signal (DL control channel), a DL data signal (DL data channel, DL shared channel and so on), a DL reference signal (DM-RS, CSI-RS and so on), a discovery signal, a synchronization signal, a broadcast signal and so on), and receive UL signals (for example, a UL control signal (UL control channel), a UL data signal (UL data channel, UL shared channel and so on), a UL reference signal and so on).

To be more specific, the transmitting/receiving sections 103 transmit DL signals and/or receive UL signals based on a predetermined numerology. In addition, the transmitting/receiving sections 103 may transmit information about the frame structures which the user terminals use to communicate and information about blanking through higher layer signaling (at least one of a broadcast signal, system information, and RRC control information). In addition, the transmitting/receiving sections 103 may place a reporting bit in downlink control information to indicate whether or not blanking resources are inserted, and transmit this downlink control information.

The transmitting section and the receiving section of the present invention are comprised of a transmitting/receiving section 103 and/or a communication path interface 106.

Figure 20:
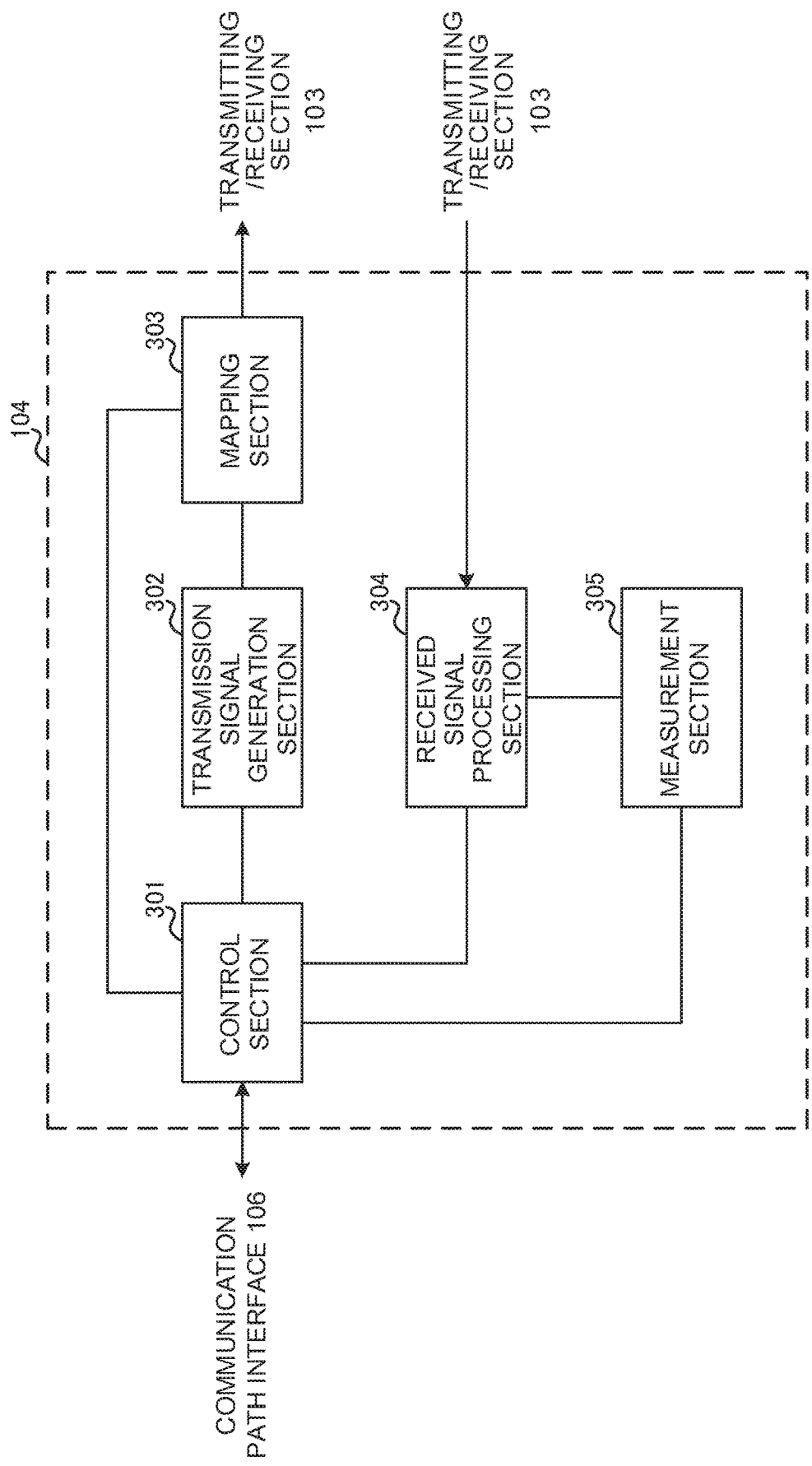
FIG. 20 is a diagram to show an example of a functional structure of a radio base station according to one embodiment of the present invention.

FIG. 20 is a diagram to show an example of a functional structure of a radio base station according to the present embodiment. Note that, although FIG. 20 primarily shows functional blocks that pertain to characteristic parts of the present embodiment, the radio base station 10 has other functional blocks that are necessary for radio communication as well. As shown in FIG. 20, the baseband signal processing section 104 has a control section 301, a transmission signal generation section 302, a mapping section 303, a received signal processing section 304 and a measurement section 305.

The control section 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of DL signals and/or UL signals. To be more specific, the control section 301 controls the transmission signal generation section 302, the mapping section 303 and the transmitting/receiving sections 103 to generate and transmit DCI (DL assignment) that contains DL data channel scheduling information, DL reference signals, DCI (UL grant) that contains UL data channel scheduling information, UL reference signals, and so on.

The control section 301 can control allocation so that frame structures of different numerologies are frequency-division-multiplexed. In this case, the control section 301 can control the allocation of DL signals and/or UL signals in a predetermined numerology, based on the communicating direction in another numerology that is different from the predetermined numerology (see FIG. 6 to FIG. 12).

The transmission signal generation section 302 generates DL signals (DL control channel, DL data channel, DL reference signals and so on) as commanded by the control section 301, and outputs these DL signals to the mapping section 303. The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302 to predetermined radio resources, as commanded by the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, UL signals that are transmitted from the user terminals 20 (UL control channel, UL data channel, UL reference signals, and so on). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, the received signal processing section 304 outputs at least one of a preamble, control information and UL data to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

Also, by using the received signals, the received signal processing section 304 may measure the received power (for example, RSRP (Reference Signal Received Power)), the received quality (for example, RSRQ (Reference Signal Received Quality)), channel states and so on. The measurement results may be output to the control section 301.

(User Terminal)

Figure 21:
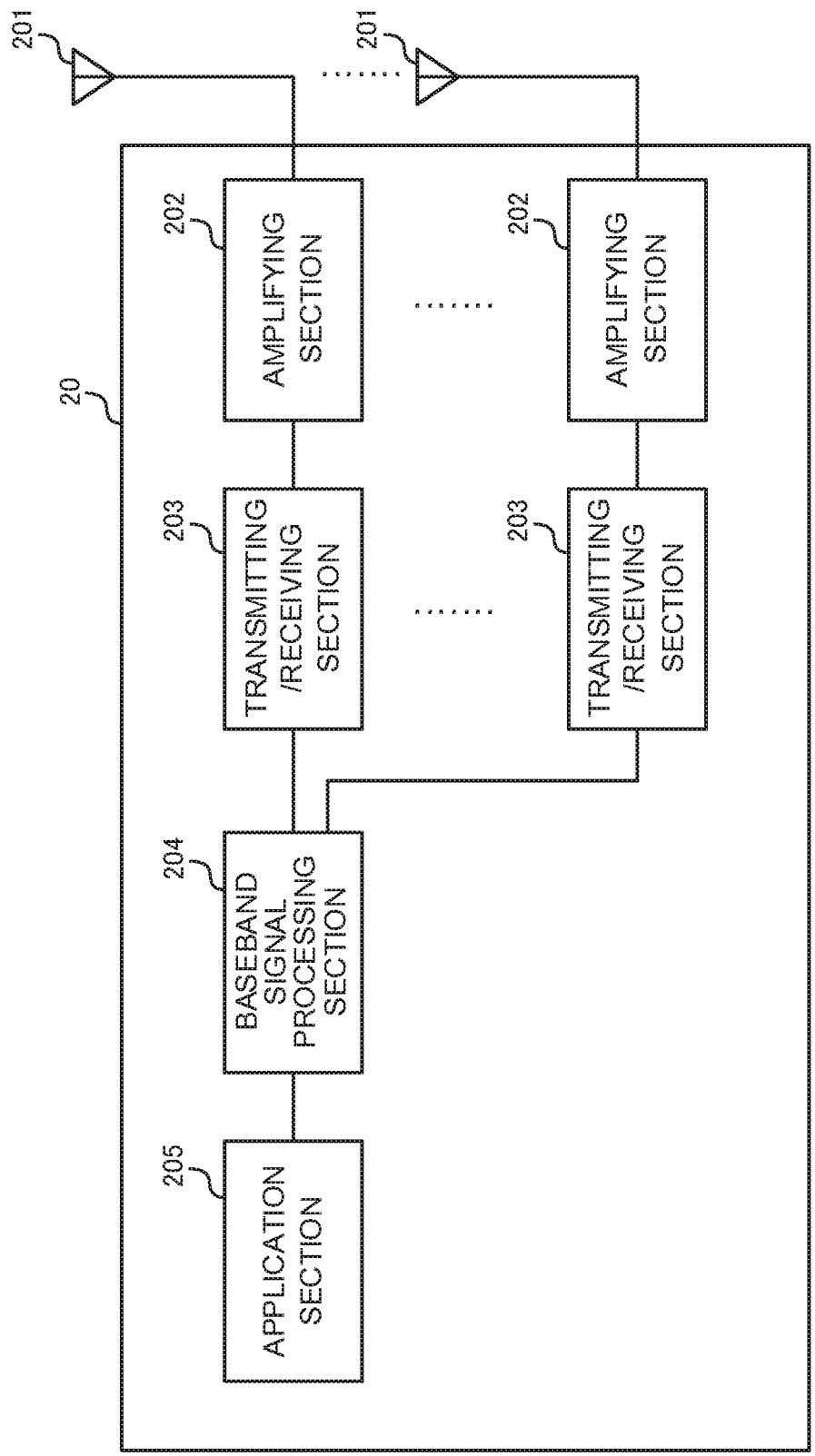
FIG. 21 is a diagram to show an example of an overall structure of a user terminal according to one embodiment of the present invention.

FIG. 21 is a diagram to show an example of an overall structure of a user terminal according to the present embodiment. A user terminal 20 has a number of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process and so on. The DL data is forwarded to the application section 205. The application section 205 performs processes related to higher layers above the physical layer and the MAC layer and so on. Also, in the DL data, the system information and the higher layer control information are also forwarded to the application section 205.

Meanwhile, the UL data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 transmit DL signals (for example, a DL control signal (DL control channel), a DL data signal (DL data channel, DL shared channel and so on), a DL reference signal (DM-RS, CSI-RS and so on), a discovery signal, a synchronization signal, a broadcast signal and so on), and receive UL signals (for example, a UL control signal (UL control channel), a UL data signal (UL data channel, UL shared channel and so on), a UL reference signal and so on).

To be more specific, the transmitting/receiving sections 203 receive DL signals and/or transmit UL signals based on a predetermined numerology. In addition, the transmitting/receiving section 203 may receive information about the frame structure which the user terminal uses to communicate, and information about blanking, through higher layer signaling (at least one of a broadcast signal, system information, and RRC control information). For example, the transmitting/receiving sections 203 receive the first information, which relates to a frame structure of a predetermined of numerology, and second information, which specifies the period in which DL communication and/or UL communication are disallowed, or the period in which a specific communicating direction is configured, in the predetermined numerology.

Here, either information that indicates the time interval and/or the cycle in which DL communication and/or UL communication are disallowed in the predetermined numerology, or information about a frame structure based on another numerology that is different from the predetermined numerology can be used as the second information. In addition, the transmitting/receiving sections 103 may place a reporting bit, which indicates whether or not blanking resources are inserted, in downlink control information, and transmit this downlink control information.

Figure 22:
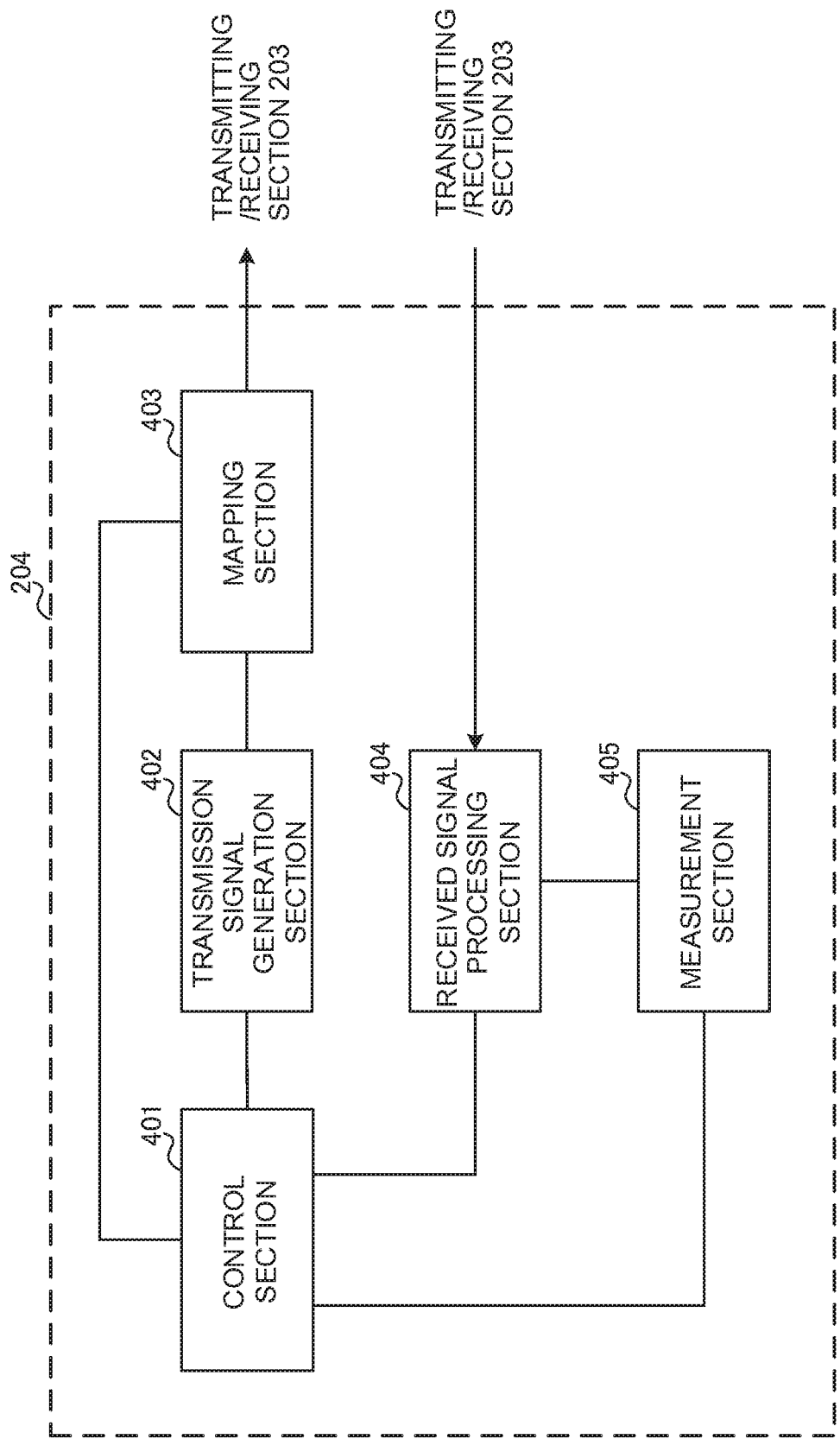
FIG. 22 is a diagram to show an example of a functional structure of a user terminal according to one embodiment of the present invention.

FIG. 22 is a diagram to show an example of a functional structure of a user terminal according to the present embodiment. Note that, although FIG. 22 primarily shows functional blocks that pertain to characteristic parts of the present embodiment, the user terminal 20 has other functional blocks that are necessary for radio communication as well. As shown in FIG. 22, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. The control section 401 can be constituted by a controller, a control circuit or control apparatus that can be described based on general understanding of the technical field to which the present invention pertains.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 controls DL receipt and/or UL transmission based on information that relates to a frame structure of a predetermined numerology, and information (information about blanking) that specifies the period in which DL communication and/or UL communication are disallowed, or the period in which a specific communicating direction is configured, in the predetermined numerology (see FIG. 13 and FIG. 14). For example, when a predetermined numerology is used, the control section 401 controls, dynamically, whether or not periods in which DL communication and/or UL communication are disallowed, or periods in which a specific communicating direction is configured, are provided, based on predetermined conditions (see FIG. 15 to FIG. 17).

The transmission signal generation section 402 generates UL signals (UL control channel, UL data channel, UL reference signals and so on) as commanded by the control section 401, and outputs the UL signals to the mapping section 403. The transmission signal generation section 402 can be constituted by a signal generator, a signal generating circuit or signal generating apparatus that can be described based on general understanding of the technical field to which the present invention pertains.

Also, the transmission signal generation section 402 generates UL data channels as commanded by the control section 401. For example, when a UL grant is included in a DL control channel that is reported from the radio base station 10, the control section 401 commands the transmission signal generation section 402 to generate the UL data channel.

The mapping section 403 maps the UL signals generated in the transmission signal generation section 402 to radio resources as commanded by the control section 401, and output the result to the transmitting/receiving sections 203. For example, the mapping section 403 exerts control so that an uplink data channel and/or an uplink control channel are not allocated in predetermined symbols (for example, intervals in which UL communication is disallowed) based on the information about blanking. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signal include, for example, DL signals transmitted from the radio base station 10 (DL control channel, DL data channel, DL reference signals and so on). The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

Based on commands from control section 401, the received signal processing section 404 performs blind decoding of the DL control channel, which schedules transmission and/or receipt of the DL data channel, and performs the receiving process of the DL data channel based on this DCI. In addition, the received signal processing section 404 estimates channel gain based on the DM-RS or the CRS, and demodulates the DL data channel based on the estimated channel gain.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of the data to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the DL received quality (for example, RSRQ), the channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 23:
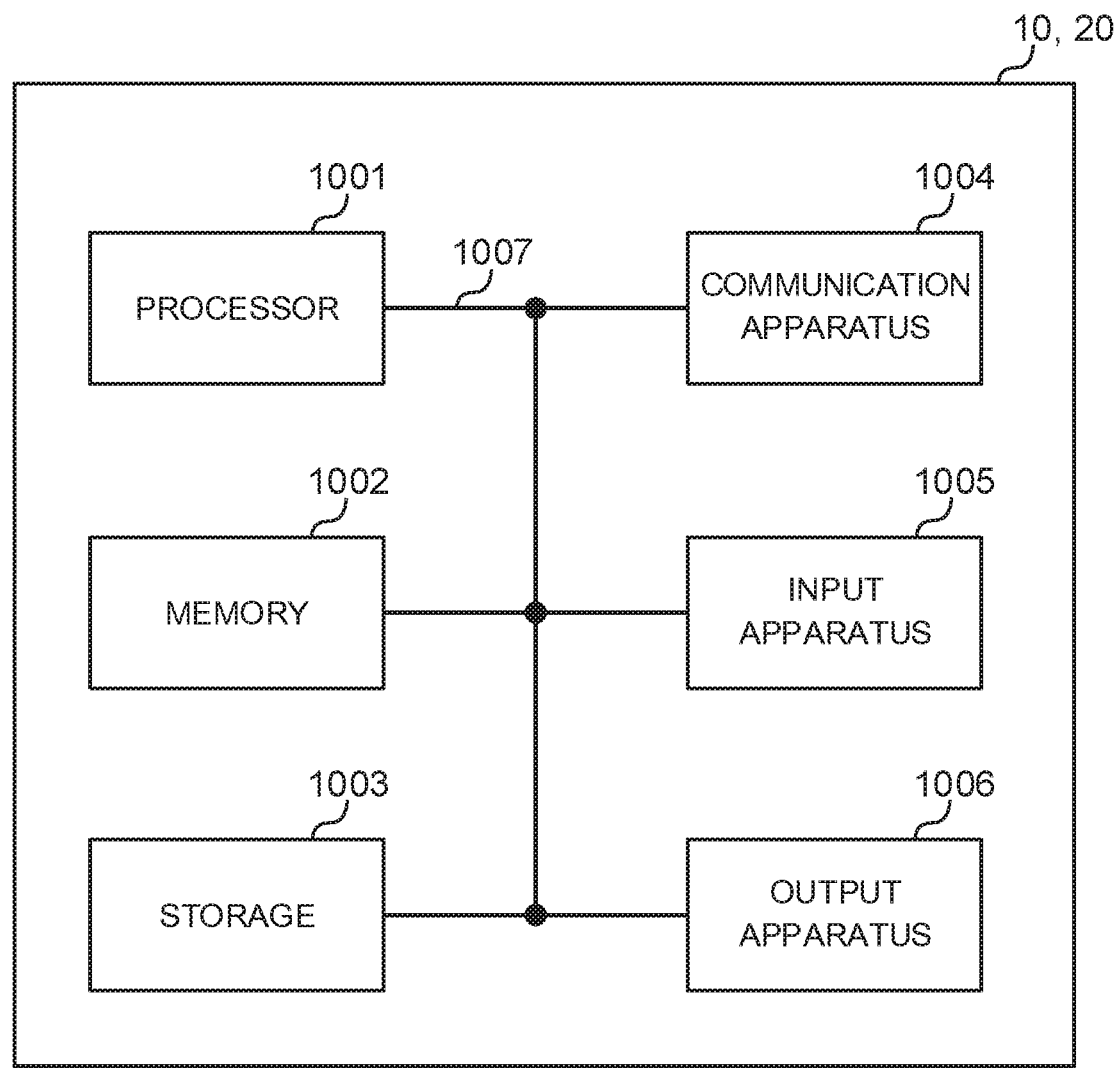
FIG. 23 is a diagram to show an example hardware structure of a radio base station and a user terminal according to one embodiment of the present invention.

That is, the radio base stations, user terminals and so on according to the embodiments of the present invention may function as a computer that executes the processes of the radio communication method of the present invention. FIG. 23 is a diagram to show an example hardware structure of a radio base station and a user terminal according to one embodiment of the present invention. Physically, a radio base station 10 and a user terminal 20, which have been described, may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a number of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules, and the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD (Frequency Division Duplex)) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Variations

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," "carrier frequency" and so on.

Furthermore, a radio frame may be composed of one or more periods (frames) in the time domain. Each of one or more periods (frames) constituting a radio frame may be referred to as a "subframe." Furthermore, a subframe may be composed of one or more slots in the time domain. Furthermore, a slot may be comprised of one or more symbols (OFDM (Orthogonal Frequency Division Multiplexing) symbols, SC-FDMA (Single Carrier Frequency Division Multiple Access) symbols, and so on) in the time domain.

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," or a number of consecutive subframes may be referred to as a "TTI," or one slot may be referred to as a "TTI." That is, a subframe and a TTI may be a subframe (one ms) in existing LTE, may be a shorter period than one ms (for example, one to thirteen symbols), or may be a longer period of time than one ms.

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this. The TTI may be the transmission time unit of channel-encoded data packets (transport blocks), or may be the unit of processing in scheduling, link adaptation and so on.

A TTI having a time duration of one ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a number of consecutive subframes in the frequency domain. Also, an RB may include one or more symbols in the time domain, and may be one slot, one subframe or one TTI in length. One TTI and one subframe each may be composed of one or more resource blocks. Note that an RB may be referred to as a "physical resource block (PRB (Physical RB))," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, symbols and the like described above are merely examples. For example, configurations pertaining to the number of subframes included in a radio frame, the number of slots included in a subframe, the number of symbols and RBs included in a slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Information, signals and so on can be output from higher layers to lower layers and/or from lower layers to higher layers. Information, signals and so on may be input and output via a number of network nodes.

The information, signals and so on that are input and/or output may be stored in a specific place (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and signals and/or combinations of these.

Physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

n are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a number of cells, the entire coverage area of the base station can be partitioned into a number of smaller areas, and each smaller area can provide communication services through base station subsystems (for example, indoor small base stations (RRHs (Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a number of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network consisting of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and/or optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-146465, filed on Jul. 26, 2016, including the specification, drawings and abstract, is incorporated herein by reference in its entirety.

The invention claimed is:

1. A terminal comprising:
a receiver that receives, by higher layer signaling, information indicating a numerology, information indicating a periodicity for a resource not available for physical downlink shared channel (PDSCH) transmission, and information indicating a symbol for a resource not available for PDSCH transmission; and
a processor that controls PDSCH reception based on the information indicating the numerology, the information indicating the periodicity, and the information indicating the symbol, in a configuration supporting communication using a plurality of numerologies,
wherein the numerology is a subcarrier spacing.

2. The terminal according to claim 1, wherein the receiver receives information indicating symbol candidates in the resource not available for PDSCH transmission and the processor determines whether or not each of the symbol candidates is configured as the resource based on downlink control information.

3. A radio communication method for a terminal, comprising:
receiving, by higher layer signaling, information indicating a numerology, information indicating a periodicity for a resource not available for physical downlink shared channel (PDSCH) transmission, and information indicating a symbol for a resource not available for PDSCH transmission; and
controlling PDSCH reception based on the information indicating the numerology, the information indicating the periodicity, and the information indicating the symbol, in a configuration supporting communication using a plurality of numerologies,
wherein the numerology is a subcarrier spacing.

4. A base station comprising:
a transmitter that transmits, by higher layer signaling, information indicating a numerology, information indicating a periodicity for a resource not available for physical downlink shared channel (PDSCH) transmission, and information indicating a symbol for a resource not available for PDSCH transmission; and
a processor that controls PDSCH transmission corresponding to the information indicating the numerology, the information indicating the periodicity, and the information indicating the symbol, in a configuration supporting communication using a plurality of numerologies,
wherein the numerology is a subcarrier spacing.

5. A system comprising a base station and a terminal, wherein:
the base station comprises:
a transmitter that transmits, by higher layer signaling, information indicating a numerology, information indicating a periodicity for a resource not available for physical downlink shared channel (PDSCH) transmission, and information indicating a symbol for a resource not available for PDSCH transmission,
a processor that controls PDSCH transmission corresponding to the information indicating the numerology, the information indicating the periodicity, and the information indicating the symbol, in a configuration supporting communication using a plurality of numerologies; and
the terminal comprises:
a receiver that receives, by higher layer signaling, the information indicating the numerology, the information indicating the periodicity, and the information indicating the symbol; and
a processor that controls PDSCH reception based on the information indicating the numerology, the information indicating the periodicity, and the information indicating the symbol, in the configuration,
wherein the numerology is a subcarrier spacing.

* * * * *